(12) United States Patent
Venkatraman et al.

(10) Patent No.: US 11,824,753 B2
(45) Date of Patent: Nov. 21, 2023

(54) NETWORK NODE-TO-NODE CONNECTIVITY VERIFICATION INCLUDING DATA PATH PROCESSING OF PACKETS WITHIN A PACKET SWITCHING DEVICE

(71) Applicant: Cisco Technology, Inc., San Jose, CA (US)

(72) Inventors: Rajagopal Venkatraman, San Jose, CA (US); Rajeev Kumar, Sunnyvale, CA (US); Roberto Mitsuo Kobo, Pleasanton, CA (US); Vikash Agarwal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/446,965

(22) Filed: Sep. 5, 2021

(65) Prior Publication Data
US 2023/0077101 A1   Mar. 9, 2023

(51) Int. Cl.
*H04L 43/12*   (2022.01)
*H04L 45/02*   (2022.01)
*H04L 45/74*   (2022.01)

(52) U.S. Cl.
CPC .............. *H04L 43/12* (2013.01); *H04L 45/02* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 6,873,599 B1 * | 3/2005 | Han | H04L 12/6418 37/353 |
| 8,340,090 B1 | 12/2012 | Bettink et al. | |
| 8,902,780 B1 * | 12/2014 | Hegde | H04L 45/70 370/252 |
| 10,673,737 B2 | 6/2020 | Indiresan et al. | |

(Continued)

FOREIGN PATENT DOCUMENTS

| | | |
|---|---|---|
| CN | 103516599 A | 1/2014 |
| WO | 2016/202066 A1 | 12/2016 |

OTHER PUBLICATIONS

English Translation of Publication WO/2016/202066 A1, generated by WIPO Patentscope on Sep. 5, 2021.

(Continued)

*Primary Examiner* — Xavier S Wong
(74) *Attorney, Agent, or Firm* — Polsinelli

(57) ABSTRACT

In one embodiment, network node-to-node connectivity verification is performed in a network including data path processing of packets within a packet switching device. In one embodiment, an echo request connectivity test packet, emulating an echo request connectivity test packet received from a first connected network node, is inserted by the packet switching device prior in its data processing path prior to ingress processing performed for packets received from the first connected network node. A correspondingly received echo reply connectivity test packet is intercepted by the packet switching device during data path egress processing performed for packets to be forwarded to the first connected network node.

20 Claims, 22 Drawing Sheets

(56) References Cited

U.S. PATENT DOCUMENTS

| | | | |
|---|---|---|---|
| 2008/0080507 A1* | 4/2008 | Swallow | H04L 43/50 370/392 |
| 2011/0072129 A1 | 3/2011 | Le Pennec et al. | |
| 2013/0088977 A1 | 4/2013 | Baillargeon | |
| 2014/0029449 A1 | 1/2014 | Xu et al. | |
| 2016/0127214 A1 | 5/2016 | Tessmer et al. | |
| 2016/0142278 A1* | 5/2016 | Pignataro | H04L 1/14 370/241.1 |
| 2016/0226744 A1 | 8/2016 | Al-Zoubi et al. | |
| 2016/0337314 A1 | 11/2016 | Yu et al. | |
| 2019/0319871 A1 | 10/2019 | Indiresan et al. | |
| 2020/0053163 A1* | 2/2020 | Ngo | H04L 69/16 |
| 2021/0160173 A1 | 5/2021 | Biradar et al. | |

OTHER PUBLICATIONS

English Translation of Publication CN 103/2016/202066 A, generated by WIPO Patentscope on Sep. 5, 2021.

"Cisco Catalyst 9600 Series Architecture," Jun. 1, 2020, White Paper, Cisco Systems, Inc., San Jose, CA, USA.

"Cisco Nexus 9500 Cloud Scale Line Cards and Fabric Modules," Jul. 21, 2021, White Paper, Cisco Systems, Inc., San Jose, CA, USA.

"Introducing Cisco Programmable Fabric (VXLAN/EVPN)," Cisco Programmable Fabric with VXLAN BGP EVPN Configuration Guide, Jun. 23, 2021, Cisco Systems, Inc., San Jose, CA, USA.

Jon Postel, "Internet Protocol," DARPA Internet Program Protocol Specification, RFC 791, Sep. 1981, Information Sciences Institute, University of Southern California, Marina del Rey, CA.

Jon Postel, "Internet Control Message Protocol," DARPA Internet Program Protocol Specification, RFC 792, Sep. 1981, Information Sciences Institute, University of Southern California, Marina del Rey, CA.

Conta et al., "Internet Control Message Protocol (ICMPv6) for the Internet Protocol Version 6 (IPv6) Specification," RFC 4443, Mar. 2006, The Internet Society, Reston, VA, USA.

Katz and Ward, "Bidirectional Forwarding Detection (BFD)," RFC 5880, Jun. 2010, The Internet Society, Reston, VA, USA.

Mahalingam et al., "Virtual extensible Local Area Network (VXLAN): A Framework for Overlaying Virtualized Layer 2 Networks over Layer 3 Networks," RFC 7348, Aug. 2014, The Internet Society, Reston, VA, USA.

Deering and Hinden, "Internet Protocol, Version 6 (IPv6) Specification," RFC 8200, Jul. 2017, The Internet Society, Reston, VA, USA.

Sajassi et al., "A Network Virtualization Overlay Solution Using Ethernet VPN (EVPN)," RFC 8365, Mar. 2018, The Internet Society, Reston, VA, USA.

Cheng et al., "Unaffiliated BFD Echo Function," draft-ietf-bfd-unaffiliated-echo-02, Jun. 22, 2021, The Internet Society, Reston, VA, USA.

Chen et al., "Unsolicited BFD for Sessionless Applications," draft-ietf-bfd-unsolicited-03, Apr. 22, 2021, The Internet Society, Reston, VA, USA.

International Search Report and Written Opinion from PCT Application No. PCT/US2022/075675 dated Dec. 14, 2022.

* cited by examiner

NODE INFORMATION TRACKING TABLE

| NODE | VNI | IP ADDRESS | M ADDRESS | PSD PORT |
|---|---|---|---|---|
| NODE1 | VNI-1 | N1-IP | N1-M | GIG10/01 |
| NODE2 | VNI-2 | N2-IP | N2-M | GIG10/03 |
| NODE3 | VNI-3 | N3-IP | N3-M | GIG10/03 |
| NODE4 | VNI-1 | N4-IP | N4-M | GIG10/02 |
| ⋮ | | | | |

310 ← table
311 → NODE1 row
312 → NODE2 row
313 → NODE3 row
314 → NODE4 row

FIGURE 3B

NODE – NODE CONNECTIVITY TRACKING TABLE

| SRC. NODE | DEST. NODE | REQ. PKT TIME | REPLY PKT TIME | STATUS & STATISTICS |
|---|---|---|---|---|
| NODE1 | NODE4 | T01 | T02 | SUCCESS A OF A RESP. RCVD. |
| NODE2 | NODE6 | T03 | T04 | SUCCESS B OF B RESP. RCVD. |
| NODE3 | NODE5 | T05 | T06 | SUCCESS C OF C RESP. RCVD. |
| NODE1 | NODE7 | T07 | T08 | FAILURE ZERO (0) OF D RESP. RCVD |
| NODE1 | NODE8 | T09 | T108 | SUCCESS E OF E RESP. RCVD. |
| ⋮ | | | | |

FIGURE 3C

NETWORK NODE-TO-NODE CONNECTIVITY VERIFICATION INCLUDING DATA PATH PROCESSING OF PACKETS WITHIN A PACKET SWITCHING DEVICE

TECHNICAL FIELD

The present disclosure relates generally to improved processing of packets in a packet switching network, including, but not limited to, network node-to-node connectivity verification including data path processing of packets within a packet switching device.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network based on one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

FIG. 3B illustrates a data structure according to one embodiment;

FIG. 3C illustrates a data structure according to one embodiment;

DESCRIPTION OF EXAMPLE EMBODIMENTS

1. Overview

Figure 1A:
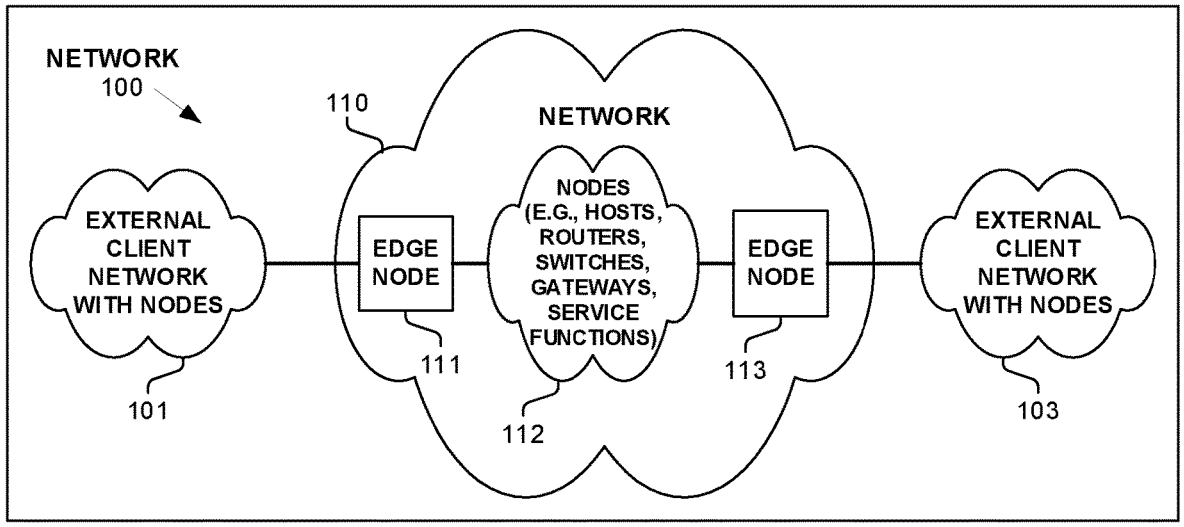
FIG. 1A illustrates a network operating according to one embodiment.

Disclosed are, inter alia, methods, apparatus, computer-storage media, mechanisms, and means associated with network node-to-node (e.g., host/server/packet switching device to host/server/packet switching device) connectivity verification, typically including data path processing of packets within a packet switching device. In one embodiment, an echo request connectivity test packet, emulating an echo request connectivity test packet received from a first connected network node (e.g., host, server), is created by the packet switching device and inserted in its data processing path prior to ingress processing performed for packets received from the first connected network node. A correspondingly received echo reply connectivity test packet is intercepted by the packet switching device during data path egress processing performed for packets to be forwarded to the first connected network node.

One embodiment comprises receiving, on a particular ingress port of a plurality of ingress ports of a packet switching device, a first plurality of packets being sent in a network from a first network node through the packet switching device to a second network node, with each packet of the first plurality of packets including, in a header, a source address of the first network node and a destination address of the second network node. The packet switching device creates one or more test echo request packets, with a plurality of packets including said one or more test echo request packets and the first plurality of packets, with each test echo request packet of said one or more test echo request packets, including in a header, the source address of the first network node and the destination address of the second network node. For each particular packet of the plurality of packets, a first network processor of a plurality of network processors of the packet switching device packet performing particular ingress processing on said particular packet including identifying a forwarding result, and sending the particular packet from the packet switching device after performing particular egress processing of said particular packet by a second network processor identified based on the forwarding result. In one embodiment, the first network processor said performs particular ingress processing on said one or more test echo request packets in response to the packet switching device ascertaining the first network processor will be said processing the first plurality of packets or has said processed at least one of the first plurality of packets.

In one embodiment, said creating one or more test echo request packets is performed by a first processor of the packet switching device; and wherein the method comprises the packet switching device, response to said ascertaining the first network processor will be said processing the first plurality of packets or has said processed at least one of the first plurality of packets, communicating said one or more test echo request packets to the first network processor.

In one embodiment, each of the plurality of packets includes a network layer protocol packet, with the source address being a network protocol source address of the first network node, and with the destination address being a network protocol destination address of the second network node. In one embodiment, the network layer protocol is Internet Protocol (IP), such as, Internet Protocol version 4 (IPv4) or Internet Protocol version 6 (IPv6). In one embodiment, each of the plurality of test echo request packets uses Internet Control Message Protocol (ICMP) for IPv4 or IPv6.

In one embodiment, each of the plurality of packets includes a data link layer packet encapsulation (e.g., Ethernet) of the network layer packet, with the data link layer packet comprising a data link level source address of the first network node and a data link level destination address of the second network node.

One embodiment includes intercepting, but not forwarding to the first network node, each particular echo reply connectivity test packet received by the packet switching device and corresponding to a said sent one of said created one or more test echo request packets, with said particular echo reply connectivity test packet including in a header a source address of the second network node and a destination address of the first network node.

In one embodiment, egress processing by a specific network processor of the plurality of network processors performs said intercepting, with the specific network processor associated with a particular egress port from which the packet switching device sends packets to the first network device. One embodiment includes configuring an access control list or other filtering mechanism associated with the particular egress port to cause said intercepting of said each particular echo reply connectivity test packet received by the packet switching device and corresponding to a said sent one of said created one or more test echo request packets. In one embodiment, said particular egress processing of said particular packet includes Virtual eXtensible Local Area Network (VXLAN) encapsulation; and wherein the method includes the packet switching device removing VXLAN encapsulation of a received packet revealing said particular echo reply connectivity test packet received by the packet switching device and corresponding to a said sent one of said created one or more test echo request packets.

In one embodiment, at least one of the first plurality of packets includes a first node-generated test echo request packet being sent in the network from the first network node through the packet switching device to the second network node; and wherein the method comprises packet processing each specific reply packet corresponding to a said sent first node-generated test echo request packet received by the packet switching device, with said particular echo reply connectivity test packet including in a header a source address of the second network node and a destination address of the first network node, and with said packet processing including forwarding said specific reply packet to the first network device.

One embodiment includes: responsive to a selecting a particular pairing of a plurality of first network node with second network node pairings, a packet switching device performing connectivity testing of the particular pairing. In one embodiment, said selecting operation is repeatedly performed in some manner such that each of the plurality of first network node with second network node pairings is selected one or more times. In one embodiment, said connectivity testing of the particular pairing includes the packet switching device creating a test echo request packet including in a header the source address of the first network node and the destination address of the second network node, and emulating packet processing of the test echo request packet as if it was received over the network from the first network node, with said packet processing including ingress processing, egress processing, and sending the test echo request packet into the network. In one embodiment, said connectivity testing of the particular pairing includes the packet switching device second egress processing each received particular echo reply connectivity test packet corresponding to a said sent test echo request packet, with said received particular echo reply connectivity test packet including in a header a source address of the second network node and a destination address of the first network node, and with said second egress processing being performed by a network processor designated to egress process packets being sent to the first network node, with said second egress processing including intercepting and second processing said received particular echo reply connectivity test packet without forwarding said received particular echo reply connectivity test packet to the first network node, with said second processing includes updating one or more data structures based on said received particular echo reply connectivity test packet.

In one embodiment, said created test packet includes an Ethernet header including a source media access control (MAC) address of the first network node and a destination MAC address of the second network node, and an Internet Protocol (IP) header including a source IP address of the first network node and a destination IP address of the second network node; and said received particular echo reply connectivity test packet includes an Ethernet header including a source MAC address of the second network node and a destination MAC address of the first network node, and an IP header including a source IP address of the second network node and a destination IP address of the first network node. In one embodiment, each of said created test packet and said received particular echo reply connectivity test packet uses Internet Control Message Protocol; and wherein a marking value identifying creation of said created test packet is included in an ICMP data field of each of said created test packet (e.g., an ICMP echo request message) and said received particular echo reply connectivity test packet (e.g., an ICMP echo reply message).

2. Description

Disclosed are, inter alia, methods, apparatus, computer-storage media, mechanisms, and means associated with network node-to-node connectivity verification including data path processing of packets within a packet switching device. In one embodiment, an echo request connectivity test packet, emulating an echo request connectivity test packet received from a first connected network node, is inserted by the packet switching device prior in its data processing path prior to ingress processing performed for packets received from the first connected network node. A correspondingly received echo reply connectivity test packet is intercepted by the packet switching device to during data path egress processing performed for packets to be forwarded to the first connected network node. One embodiment uses ICMP request and echo messages. One embodiment includes using one or more other keep alive request and response protocols. One embodiment uses Bidirectional Forwarding Detection (BFD) connectivity verification packets, such as, but not limited to, BFD echo packets and unsolicited BFD.

By creating an echo request test pack that emulates an echo request test packet that would be received from a first network node (and addressed from the first network node to a second network node) and then performing the same packet processing (including forwarding from the packet switching device to the second network node) on the created emulated echo request test packet, the operation of the packet switching device is improved as effectively the full path within the packet switching device that would be taken by an echo request test packet that was received from a first network node is checked for accurate processing (e.g., ingress processing; policing; QoS processing; internal forwarding; security tag and/or other security processing, Access Control List processing; forwarding lookup operation(s); egress processing; packet forwarding from the packet switching device towards the second network node, typically with automated correction action taken as identified and needed.

Similarly, by processing a received connectivity verification response packet being sent from the second network node to the first network node (e.g., being transmitted in response to an echo request test packet created and sent by the packet switching device) in the same manner as a standard packet being sent from the second network node to the first network node and then intercepting it during egress processing associated with packets being sent to the first network node, the operation of the packet switching device is improved as effectively the full path within the packet switching device that would be taken by a received echo reply test packet is checked for accurate processing (e.g., ingress processing; policing; QoS processing; internal forwarding; Access Control List processing; forwarding lookup operation(s); egress processing until interception), typically with automated correction action taken as identified and needed.

As used herein and unless specifically qualified, the term "Internet Protocol" ("IP") refers to IP version 4 (IPv4) or IP version 6 (IPv6). Likewise, the term Internet Control Message Protocol (ICMP) refers to an IPv4 or IPv6 version. The terms "node" and "network node" are used herein to refer to a physical or virtual router apparatus, including, but not limited to a packet switching device, host, server, etc. As used herein, the term "Ethernet" is used as to describe a layer 2 encapsulation protocol, with the teachings provided herein applied to other Layer 2/Data Link Layer protocols. As used herein, the term IP is used as a Layer 4 protocol, with the teachings herein applied to other Layer 4/Network Link Layer protocols as well as to Multiprotocol Label Switching (MPLS) protocol. As used herein, "VXLAN" refers to VXLAN and protocol extensions thereof (e.g., VXLAN Generic Protocol Extension (VXLAN-GPE), VXLAN Group Policy Option (VXLAN-GPO)).

The term "route" is used herein to refer to a fully or partially expanded prefix/route (e.g., for IPv4: 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. Also, as used herein, "forwarding information" includes, but is not limited to, information describing how to process (e.g., forward, send, manipulate, modify, change, drop, copy, duplicate, receive) corresponding packets. In one embodiment, determining forwarding information is performed via one or multiple lookup operations (e.g., ingress lookup operation(s), an egress lookup operation(s)). Also, the term "processing" when referring to processing of a packet process refers to a broad scope of operations performed in response to a packet, such as, but not limited to, forwarding/sending, dropping, manipulating/modifying/changing, receiving, duplicating, creating, intercepting, consuming, policing, quality of service processing, applying one or more service or application functions to the packet or to the packet switching device (e.g., updating network configuration, forwarding, network, management, operations/administration/management and/or other information), etc. Also, as used herein, the term processing in "parallel" is used in the general sense that at least a portion of two or more operations are performed overlapping in time. The term "interface," expansively used herein, includes the interface infrastructure (e.g., buffers, memory locations, forwarding and/or other data structures, processing instructions) that is used by a network node in performing processing related to packets. Further, as used herein, a "virtual interface," in contrast to a "physical interface," is an interface that does not directly connect to an external electrical or optical cable (e.g., to the cable's terminating interface) or other communications mechanism.

As described herein, embodiments include various elements and limitations, with no one element or limitation contemplated as being a critical element or limitation. Each of the claims individually recites an aspect of the embodiment in its entirety. Moreover, one or more embodiments described include, but are not limited to, inter alia, systems, networks, integrated circuit chips, embedded processors, ASICs, other hardware components, methods, and computer-readable media containing instructions. In one embodiment, one or more systems, devices, components, etc., comprise the embodiment, which may include some elements or limitations of a claim being performed by the same or different systems, devices, components, etc. when compared to a different one embodiment. In one embodiment, a processing element includes a general processor, task-specific processor, ASIC with one or more processing cores, and/or any other co-located, resource-sharing implementation for performing the corresponding processing. The embodiments described hereinafter embody various aspects and configurations, with the figures illustrating exemplary and non-limiting configurations. Computer-readable media and means for performing methods and process block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, are typically performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing is be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment. The use of the term "one embodiment" repeatedly herein is used to describe associated features, elements and/or limitations that are included in one or more embodiments, but does not establish a cumulative set of associated features, elements and/or limitations that each and every embodiment must include. Although, one embodiment may include all these features, elements and/or limitations. In addition, the terms "first," "second," etc., as well as "particular" and "specific" are used herein to denote different units (e.g., a first widget or operation, a second widget or operation, a particular widget or operation, a specific widget or operation). The use of these terms herein does not connote an ordering such as one unit, operation or event occurring or coming before another or another characterization, but rather provides a mechanism to distinguish between elements units. Moreover, the phrases "based on x," "in response to x," "responsive to x" are used to indicate a minimum set of items "x" from which something is derived or caused, wherein "x" is extensible and does not necessarily describe a complete list of items based on which the operation is performed. Additionally, the phrase "coupled to" or "communicatively coupled to" is used to indicate some level of direct or indirect connection between elements and/or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive/open-ended, and does not exclude additional, unrecited elements, method steps, etc. Finally, the term "particular to machine," when recited in a method claim for performing steps, refers to a particular machine within the 35 USC § 101 machine statutory class.

FIG. 1A illustrates a network 100 (e.g., one or more networks of one or more different entities) operating using one or more protocol layers in processing packets (e.g., using overlay and underlay protocols/networks). As shown, network 100 includes client networks 101 and 103 communicatively coupled to a provider network 110. In one embodiment, networks 101 and 103 are the same network and/or operated by a same entity in one embodiment. In one embodiment, networks 101 and 103 include network nodes operated by different entities. In one embodiment, network 110 uses Segment Routing (SR), Multiprotocol Label Switching (MPLS), tunnels, Ethernet VPN (EVPN), Provider Backbone Bridging EVPN (PBB-EVPN), Virtual eXtensible Local Area Network (VXLAN), Virtual eXtensible Local Area Network Generic Protocol Extension (VXLAN-GPE), Generic Routing Encapsulation, Internet Protocol version 4 and/or 6 (IP), and/or other encapsulating protocol and/or packet forwarding protocol/technology.

In one embodiment, provider network 110 includes provider edge nodes 111 and 113, and a network 112 of network nodes (e.g., packet switching devices, routers, switches, gateways, service functions, hosts (e.g., end nodes), network management, operations support systems, path computation engines, etc.). In one embodiment, provider edge nodes 111 and 113 process packets received from, or being sent to, networks 101 and 103, which may include encapsulating a received native IP packet, forwarding the encapsulated packet through network 112, and subsequently decapsulating and forwarding the native (e.g., IP) packets into network 101 and 103. In one embodiment, edge nodes 111 and 113 perform ingress and egress processing of packets, which may include adding and extracting operations data fields and operations data to and from packets.

Figure 1B:
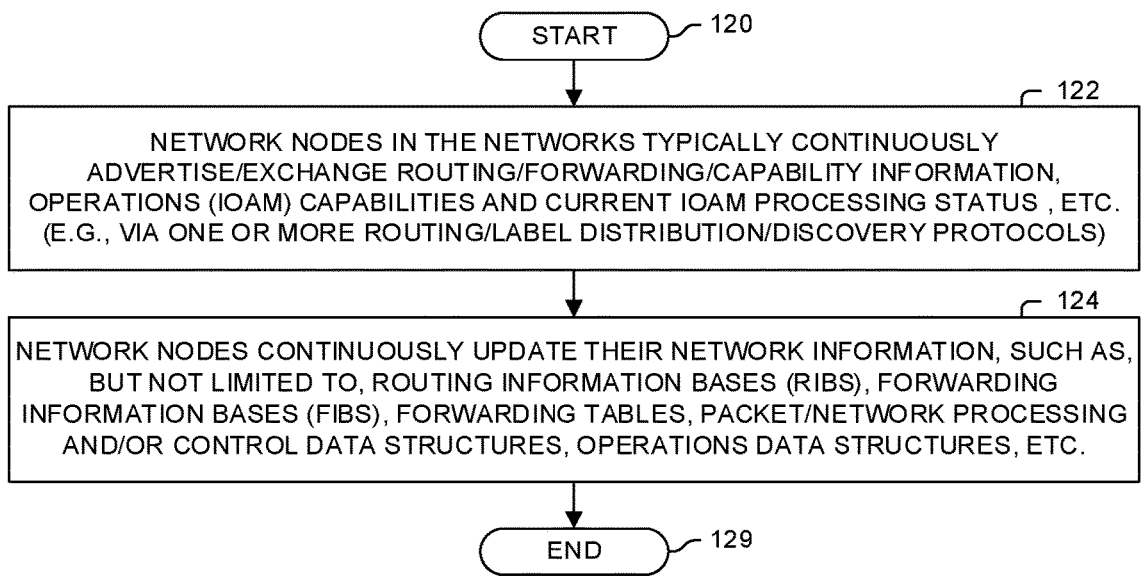
FIG. 1B illustrates a process performed according to one embodiment.

FIG. 1B illustrates a process according to one associated with network node-to-node connectivity verification including data path processing of packets within a packet switching device. Processing begins with process block 120. In process block 122, network nodes in the network(s) continuously advertise/exchange routing, switching and/or other forwarding information via one or more routing, label distribution, discovery, signaling and/or other control-plane protocols. In one embodiment, this information includes capability information and/or operating parameter negotiation between one or more packet switching devices. In process block 124, the network nodes continuously update the stored information, such as, but not limited to, updating Routing Information Bases (RIBs), Forwarding Information Bases (FIBS), bridging/forwarding tables, quality of service information, packet/network processing and/or control data structures, operations data structures, etc. Processing of the flow diagram of FIG. 1B is complete as indicated by process block 129.

Figure 1C:
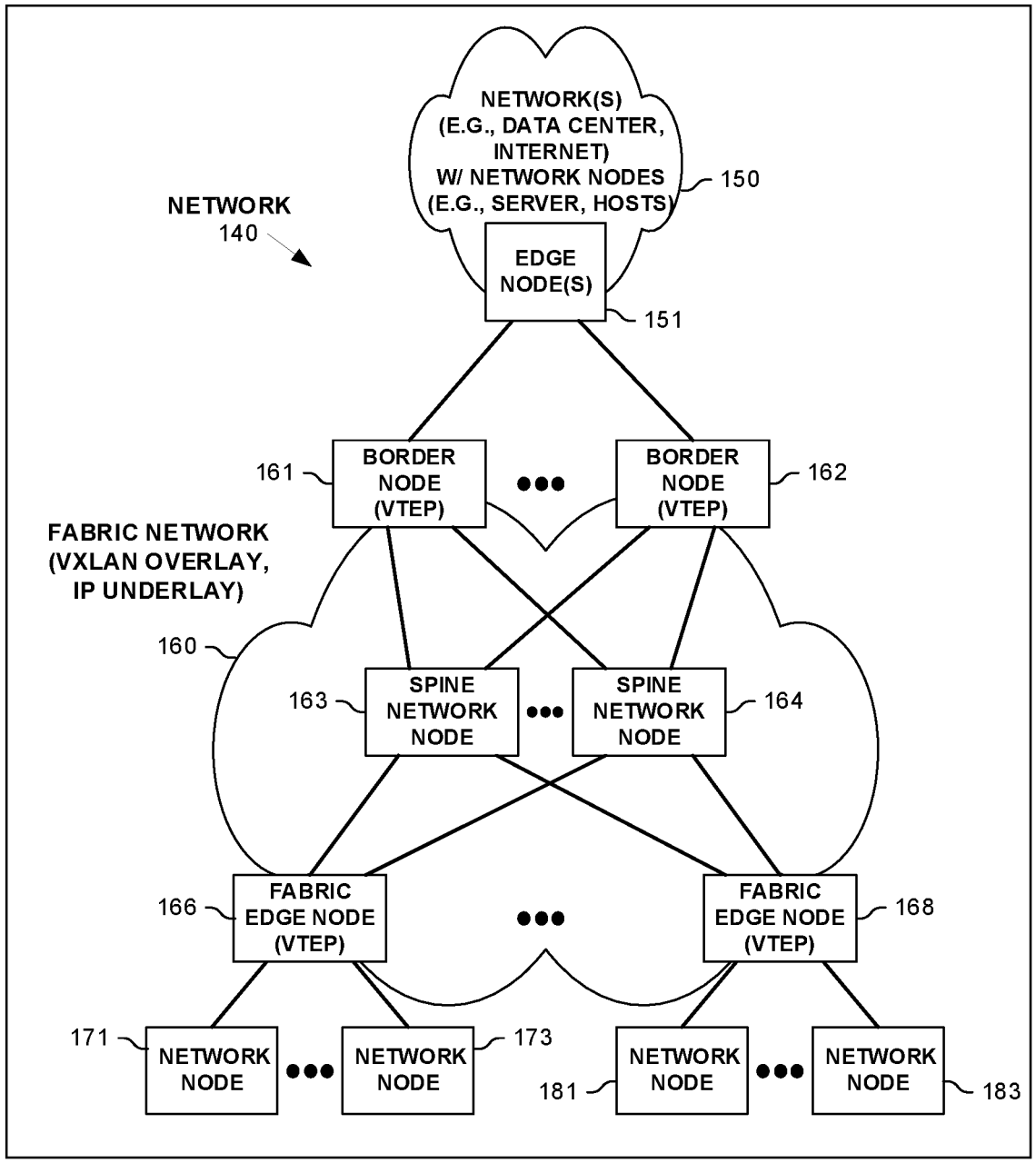
FIG. 1C illustrates a network operating according to one embodiment.

FIG. 1C illustrates a network 140 operating according to one embodiment. As shown, network 140 includes a fabric network 160 using a VXLAN overlay network over and IP underlay network, including multiple border nodes 161-162, multiple spine nodes 163-164, and multiple fabric edge nodes 166-168. Border nodes 161-162 and fabric edge nodes 166-168 include VXLAN tunnel endpoints (VTEPs), which terminate VXLAN tunnels. In one embodiment, the VTEPs are virtual and/or physical switch ports. Each of border nodes 161-162 is communicatively coupled to edge node 151 of network 150 (e.g., Internet, other network(s)). Fabric edge node 166 is communicatively coupled to network nodes 171-173 (e.g., hosts/servers), and fabric edge node 168 is communicatively coupled to network nodes 181-183 (e.g., hosts/servers).

FIGS. 2A-E and 3A and their discussion herein provide a description of various network nodes according to one embodiment.

Figure 2A:
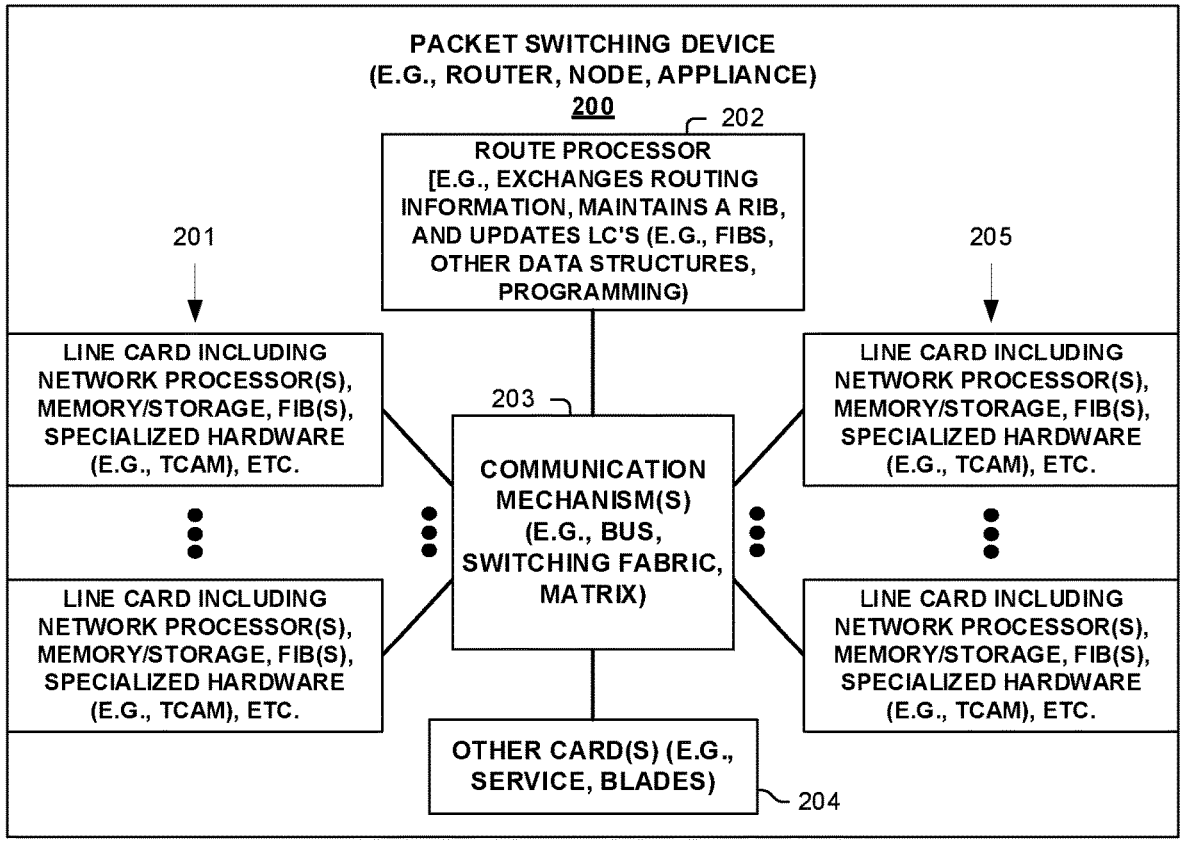
FIG. 2A illustrates a packet switching device according to one embodiment.

FIG. 2A illustrates one embodiment of a packet switching device 200 (e.g., router, node, switching, appliance, gateway) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with network node-to-node connectivity verification including data path processing of packets within a packet switching device. Packet switching device 200 also has a control plane with one or more processing elements (e.g., Route Processor(s)) 202 for managing the control plane and/or control plane processing of packets associated with network node-to-node connectivity verification including data path processing of packets within a packet switching device. Packet switching device 200 also includes other cards 204 (e.g., service cards, blades) which include processing elements that are used in one embodiment to process (e.g., forward/send, drop, manipulate, change, modify, receive, create, duplicate, perform operations data processing functionality, apply a service according to one or more service functions) associated with network node-to-node connectivity verification including data path processing of packets within a packet switching device, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, operations data processing and storage functions are implemented on line cards 201, 205.

In one embodiment, connectivity echo request test packets are created within one or more of elements 201, 205, 202, and 204, and communicated, as required, to corresponding ingress processing within a corresponding line card 201, 205. In one embodiment, connectivity echo reply test packets are intercepted during corresponding egress processing within a corresponding line card 201, 205, and communicated to a test packet processing unit within one or more of elements 201, 205, 202, and 204 for processing and/or forwarding to an external network node or another element within packet switching device 200.

Figure 2B:
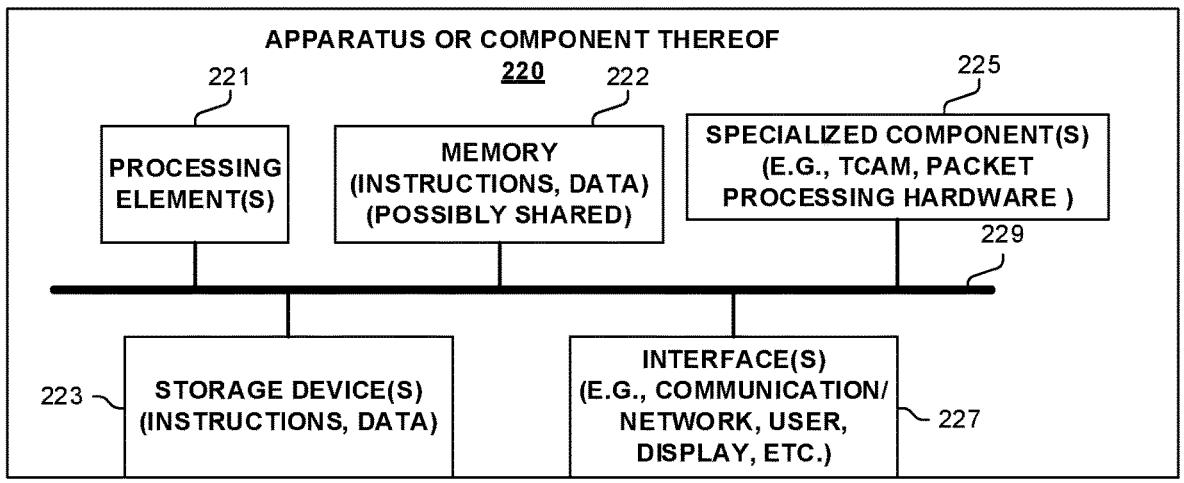
FIG. 2B illustrates an apparatus according to one embodiment.

FIG. 2B is a block diagram of an apparatus 220 (e.g., network node, host, server, packet switching device, router, other appliance, or portion thereof) used in one embodiment associated with network node-to-node connectivity verification including data path processing of packets within a packet switching device. In one embodiment, apparatus 220 performs one or more processes, or portions thereof, of a network node corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup, packet processing (including Segment Routing processing) and/or service function operations; associative memory; binary and/or ternary content-addressable memory; Application Specific Integrated Circuit(s), cryptographic hash hardware, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 2C:
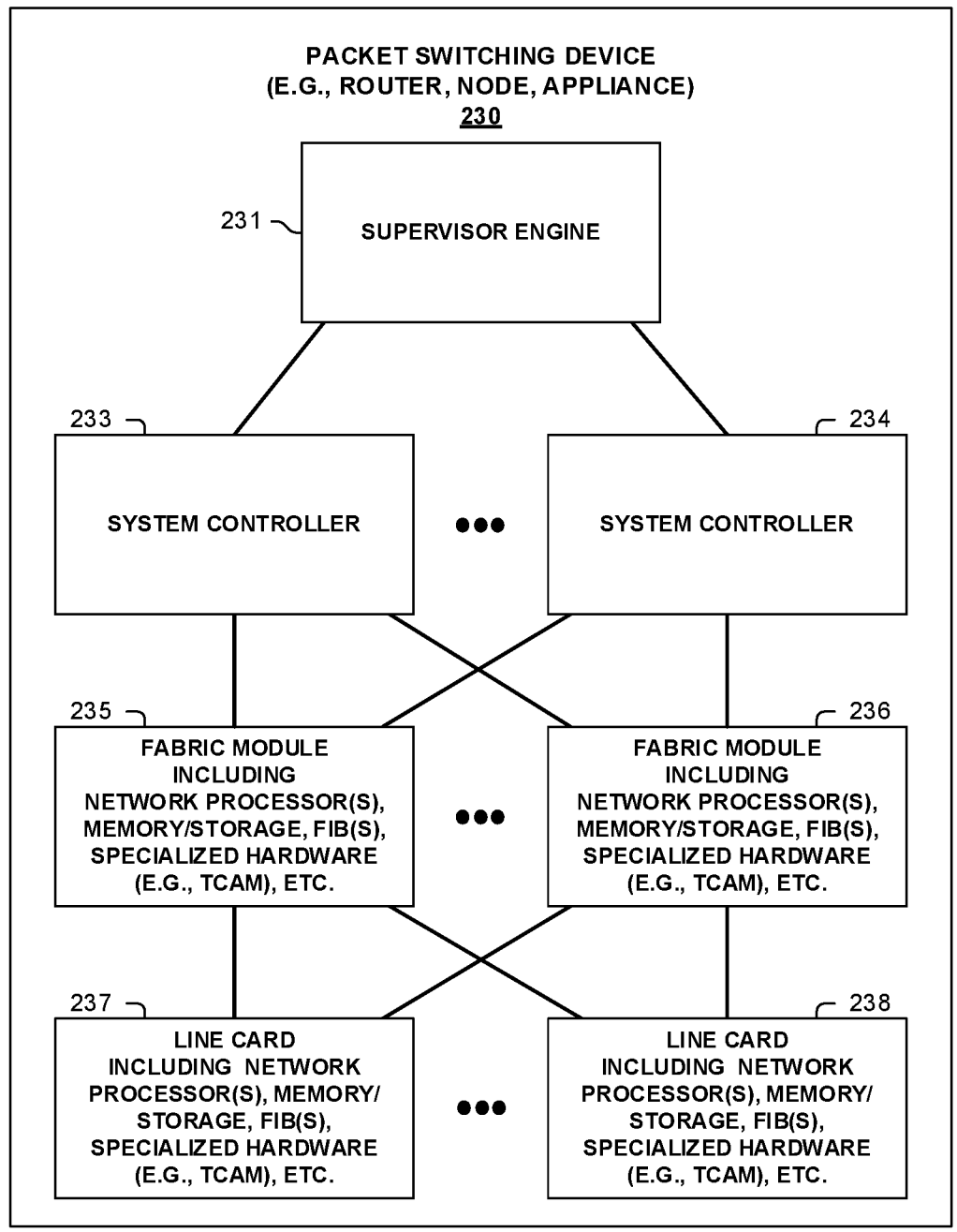
FIG. 2C illustrates a packet switching device according to one embodiment.

FIG. 2C illustrates one embodiment of a packet switching device 230 (e.g., router, node, switching, appliance, gateway) according to one embodiment. As shown, packet switching device 230 includes multiple line cards 237-238 internally interconnected with multiple fabric modules 235-236 using a folded Clos topology (often referred to as a fat-tree topology) providing data plane processing of packets, as well as performing applications. ASICs on the fabric modules 235-236 form the spine layer, and ASICs on the line cards 237-238 form the leaf layer. Packet switching device 230 uses an intelligent shared-memory egress buffered architecture. Depending on the embodiment, each of line cards 237-238 and fabric modules 235-236 are programmed to perform packet processing operations based on a flexible forwarding table, allowing hierarchical and pipelined processing of packets as they traverse the internal Clos network. Packet switching device 230 includes supervisor engine 231 centrally running the control plane, while offloading to system controllers 233-234 internal component connectivity and management functions. Decoupling the internal management tasks from the supervisor engine 231 increases the reliability of the switch control plane. It provides better modularity and resiliency of the entire packet switching system 230.

In one embodiment, connectivity echo request test packets are created within one or more of elements 231-237, and communicated, as required, to corresponding ingress processing within a corresponding line card 237-238 or fabric module 235-236. In one embodiment, connectivity echo reply test packets are intercepted during corresponding egress processing within a corresponding line card 237-238 or fabric module 235-236, and communicated to a test packet processing unit within one or more of elements 231-237 for processing and/or forwarding to an external network node or another element within packet switching device 230.

Figure 2D:
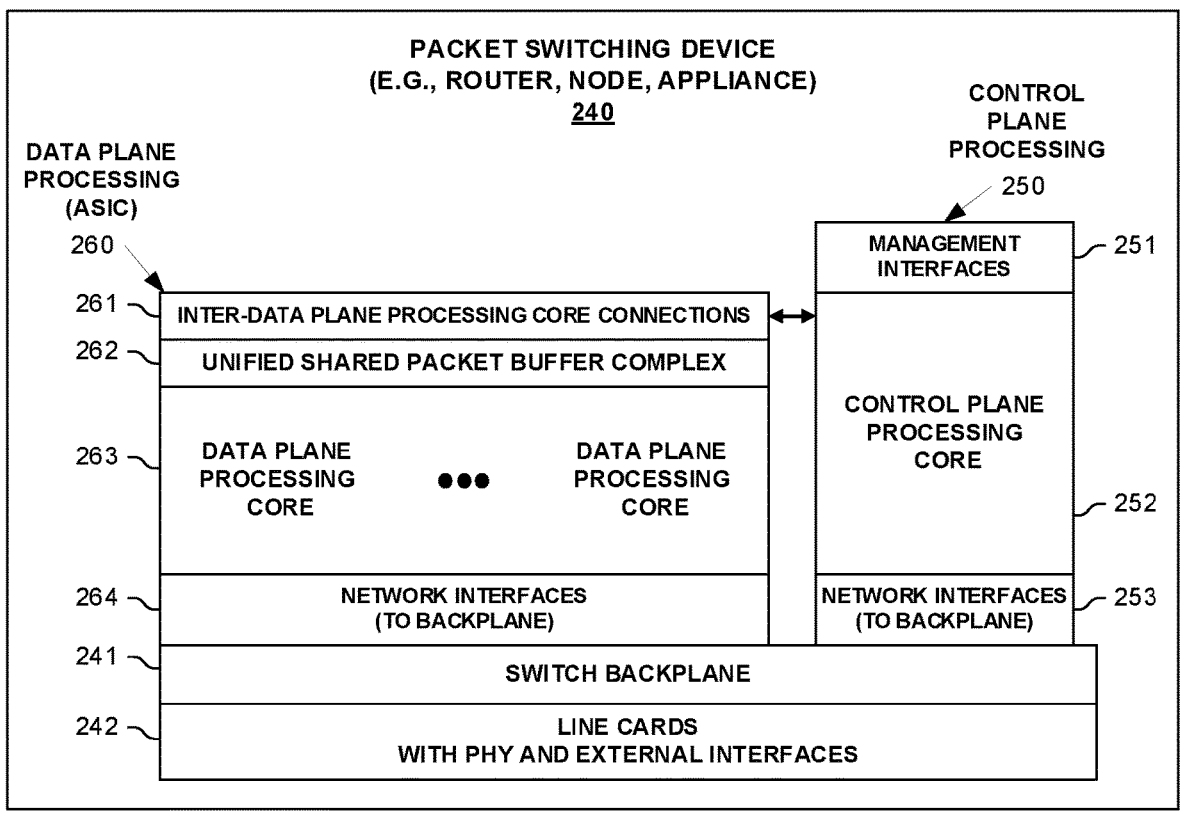
FIG. 2D illustrates a packet switching device according to one embodiment.

FIG. 2D illustrates one embodiment of a packet switching device 240 (e.g., router, node, switching, appliance, gateway) according to one embodiment. As shown, packet switching device 240 includes data plane processing elements (260) and control plane processing elements (250) and includes switch backplane 241 and line cards (with PHY and external interfaces) 242. Control plane processing elements 250 include management interfaces 251, control plane processing core 252, and network interfaces 253 (to switch backplane 241). Data plane processing elements 260 include inter-data plane processing core connections 261, shared packet buffers 262, data plane processing cores 263, and network interfaces 264 (to switch backplane 241).

In one embodiment, connectivity echo request test packets are created within control plane processing core 252, and communicated, to corresponding ingress processing within data plane processing core 263. In one embodiment, connectivity echo reply test packets are intercepted during corresponding egress processing within data plane processing core 263, and then communicated to control plane processing core 252 for processing and/or forwarding to an external network node or another element within packet switching device 240

Figure 2E:
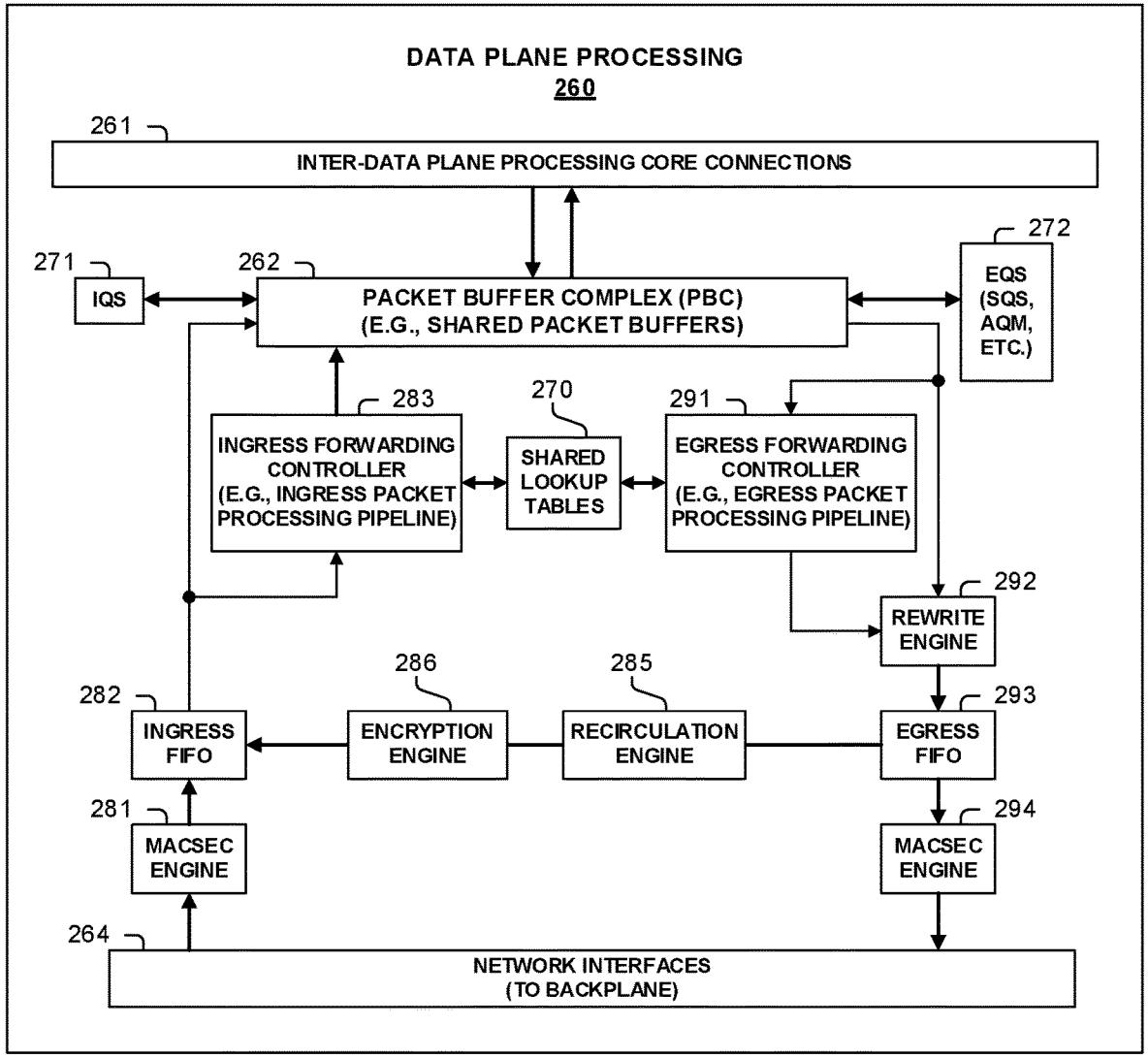
FIG. 2E illustrates a packet switching device according to one embodiment.

FIG. 2E illustrates data plane processing elements 260 of one embodiment, such as, but not limited to those of packet switching device 240 of FIG. 2D. As shown, data plane processing elements 260 include inter-data plane processing core connections 261, Unified Packet Buffer Complex (PBC) 262, network interfaces 264, Ingress Queue Scheduler (IQS) 271, and Egress Queue System (EQS) 272. In one embodiment, EQS 272 includes a Stack Queuing and Scheduling (SQS) block (managing packets received from another core) and Active Queue Management (AQM) (which manages the port queues). Data plane processing elements 260 also include ingress Media Access Control Security (MACsec) encryption block 281, ingress first-in-first-out queue (FIFO) 282, ingress forwarding controller 283 (typically including an ingress packet processing pipeline), egress forwarding controller 291 (typically including an egress packet processing pipeline), shared lookup tables 270 (shared among elements within ingress forwarding controller 283 and egress forwarding controller 291), rewrite engine 292, egress FIFO 293, egress MACsec 294, recirculation engine 285, and encryption engine 286.

In one embodiment, when a packet enters the data plane processing system 260, it is associated with an internal descriptor. The descriptor is formed from multiple bytes, with some bits dedicated for Quality of Service (QoS). These QoS bits are initially set as per the ingress markers into the packet header. The descriptor is used to hold temporary results from different lookup stages, and these results are used as input between different stages. The descriptor is associated with the packet until the packet leaves the switch. Once the final forwarding decision is done, the information from the descriptor is used to rewrite the packet.

When a packet enters the data plane processing 260 from network interfaces 264, it goes to ingress MACsec block 281 for decryption, if needed. Next, ingress FIFO 282 is used to create a copy of the packet, and while the packet is stored unchanged in the Packet Buffer Complex (PBC) 262. In one embodiment, Ingress Forwarding Controller (IFC) 283 performs multiple parallel lookups and stores store the lookup results in the packet's internal descriptor. This ingress processing typically includes ingress classification, policing, and packet marking.

If the packet needs to traverse to another processing ASIC (e.g., processing core), it will be sent over inter-data plane processing core connections 261 by Ingress Queue Scheduling (IQS) block 271 and received by Scheduling (SQS) block (272) (associated with the another processing ASIC). If the packet will be sent over the same ASIC (e.g., stays within data processing 260), it will not be sent over inter-data plane processing core connections 261 but communicated via PBC 262.

When the packet is received either from inter-data plane processing core connections 261 or the local PBC 262, it is ready for egress processing. It is sent to the Egress Queue System (EQS) 272 for queuing. The EQS 272 is built on two sub-blocks: the SQS, which received the packet from the stack, and Active Queue Management (AQM), which manages the port queues. Then a copy of the packet and the information from the packet's internal descriptor that was set on ingress is used by the Egress Forwarding Controller (EFC) 291 to apply the features configured on egress. This egress processing typically includes egress classification, policing, and packet marking.

Once the egress lookup completes, the final result is stored in the packet's internal descriptor. For one data plane processing path within data plane processing 260, the packet is rewritten by rewrite engine 292 based on the final value in the packet's internal descriptor and enqueued in egress FIFO 293. Once dequeued, the packet will be encrypted, as required, by MACsec engine 294 and sent out of data plane processing 260 (the ASIC) via network interfaces 264.

In one embodiment, a packet will use recirculation engine 285 (and possibly using encryption engine 286) to forward a packet from the egress path (e.g., including egress forwarding controller 291) to the ingress path (e.g., including ingress forwarding controller 283) of data plane processing 260. For example, a received encapsulated packet will be processed by ingress forwarding controller 283, applying appropriate ingress policies including a forwarding lookup operation result to forward the packet to egress forwarding controller 291. After skipping egress lookup operations, egress forwarding controller 291 decapsulates and forward the inner packet to ingress forwarding controller 283 via recirculation engine 285.

In one embodiment, data packets being sent from control plane processing core (252, FIG. 2D) (e.g., including created connectivity test echo request packets) are provided to ingress forwarding controller 283 via inter-data plane processing core connections 261 and recirculation engine 285. In one embodiment, data packets destined to control plane processing core 252 (FIG. 2D) are communicated from ingress forwarding controller via PBC 262 and inter-data plane processing core connections 261. In one embodiment, data packets destined to control plane processing core 252 (FIG. 2D) (e.g., including received connectivity test echo reply packets responsive to created and sent connectivity test echo request packets) are communicated from egress forwarding controller 291 via recirculation engine 285, ingress forwarding controller 283, and PBC 262 and inter-data plane processing core connections 261.

Figure 3A:
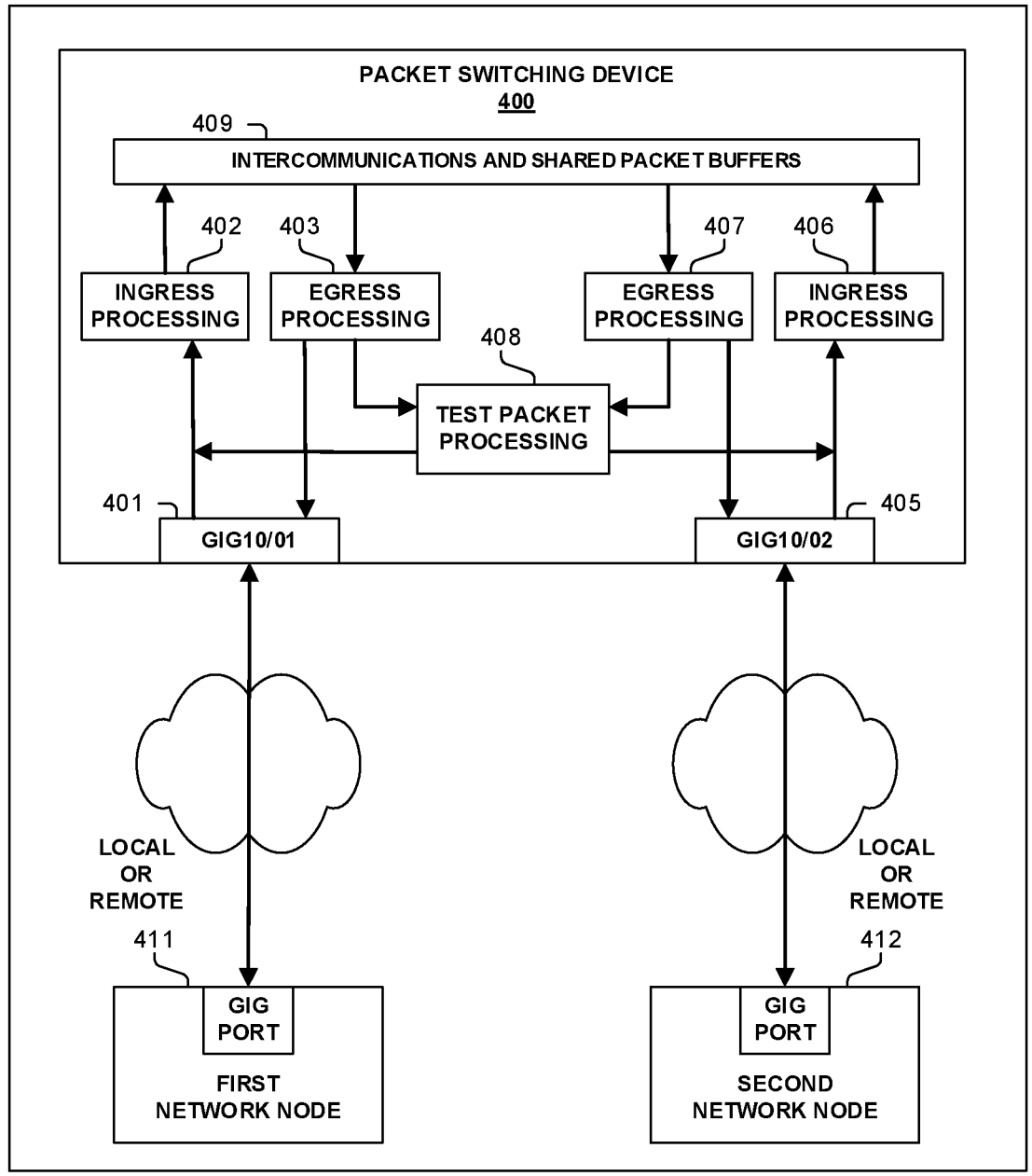
FIG. 3A illustrates a packet switching device in a network according to one embodiment.

FIG. 3A illustrates a packet switching device 400 according to one embodiment as shown therein. In one embodiment, packet switching device 400 represents a processing architecture of packet switching device 200 (FIG. 2A), apparatus or component 220 (FIG. 2B), packet processing device 230 (FIG. 2C), packet switching device 240 (FIG. 2D) (e.g., using data plane processing 260 of FIG. 2E or another data plane processing architecture), and/or another packet switching device.

As shown in FIG. 3A, packet switching device 400 includes network interfaces 401 and 405, ingress processing 402 and 406, egress processing 403 and 407, test packet processing 408 (e.g., one more processors/processing cores and associated memory and lookup tables), and intercommunications and shared packet buffers 409. Packet switching device 400 is communicatively coupled via interface 401, directly or via one or more networks, to first network node 411; and communicatively coupled via interface 405, directly or via one or more networks, to second network node 412. Each of FIGS. 4A-H and 5A-D illustrate operations performed, data structure(s), architecture(s) and/or other features and functionality of one embodiment of packet switching device 400.

FIG. 3B illustrates a node information tracking table 310 (e.g., one or more data structures stored in memory) that maintains information related to network nodes used by one embodiment of packet switching device 400 in performing network node-to-node connectivity verification including data path processing of packets within packet switching device 400. One embodiment performs network node-to-node connectivity verification for local and/or remote nodes. A "local node" refers to a directly connected network node (e.g., via an Ethernet or fiber connection) and a "remote node" refers to a non-directly connected network node (e.g., connected through one or more routers). One embodiment does not store all information shown in FIG. 3B as this information may be located in another data structure or otherwise easily obtainable, or may not be required (e.g., based on the network configuration, and the protocol layer headers included in connectivity test packets for particular node-node pairings).

In one embodiment, node information tracking table 310 includes multiple entries 311-314, with each shown entry 311-314 identifying a name of network node, its virtual network identifier (VNI), its IP address, its MAC (link layer) address, and one or more ports (401, 405) of packet switching device 400 used for reaching the node. In one embodiment, the node name is available via DNS, another service, or configuration information. In one embodiment, the link layer address and/or IP address is available via address resolution protocol (ARP) (e.g., stored in an ARP table of packet switching device 400), another service, or configuration. In one embodiment, the port (401, 405) is available in a routing or forwarding table of packet switching device 400.

FIG. 3C illustrates a node-node connectivity tracking table 320 (e.g., one or more data structures stored in memory) that maintains information related to connectivity verification testing between designated network nodes. In one embodiment, node-node connectivity tracking table 320 includes multiple entries 321-325, with each entry identifying a source network node (e.g., the emulated source node of the test echo request packet), a destination node (e.g., to which the test echo request packet is sent), a time of sending of the last test echo request packet, a timer of receiving the last echo reply connectivity test packet received in response to a sent test echo request packet, and connectivity test result statistics and current connectivity status determined from sent and received connectivity test packets. In one embodiment, the source-destination node pairing of an entry (e.g., whose connectivity is to be checked) is made an entry 321-325 in table 320 based on, but not limited to, identified mission-critical operations, snooping connections, NetFlow information, network management system data, configuration information, host detection.

Figure 3D:
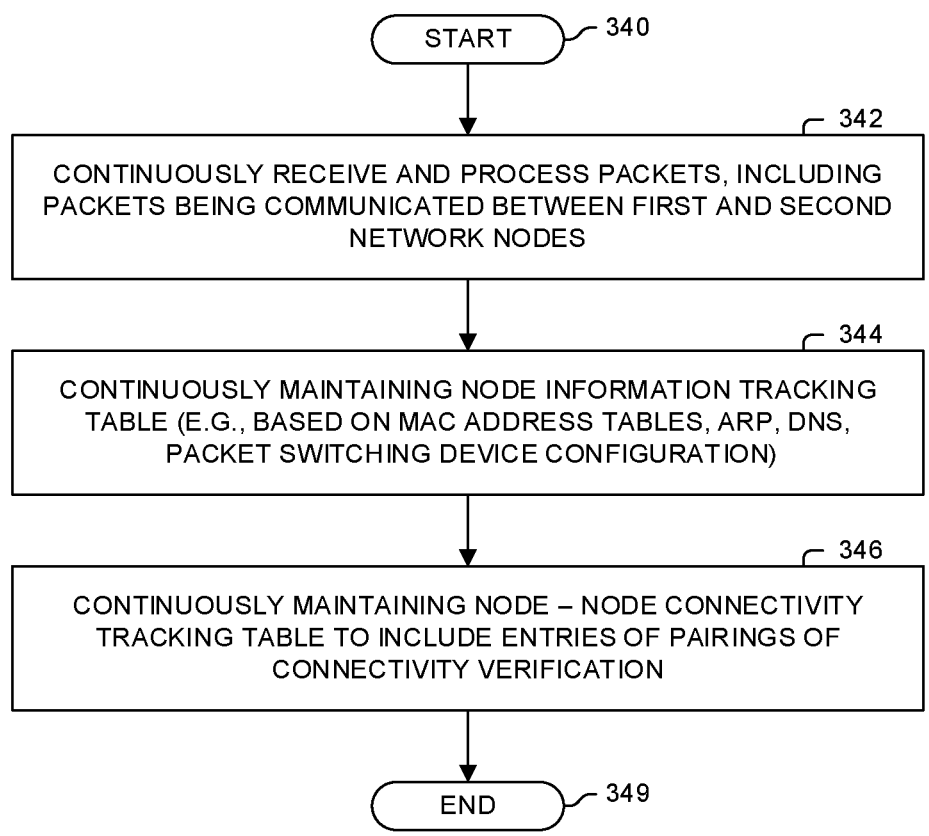
FIG. 3D illustrates a process performed according to one embodiment.

FIG. 3D illustrates parallel processes performed in one embodiment as identified by their respective process blocks. Processing begins with process block 340. Per process block 342, the packet switching device continuously receives and processes packets, including packets being communicated between first and second network nodes. Per process block 344, the packet switching device continuously maintains node information tracking table 310 (of FIG. 3B) (e.g., based on static and/or dynamic MAC address tables, ARP, DNS, packet switching device configuration). Per process block 346, the packet switching device continuously maintains node-node connectivity tracking table 320 (FIG. 3C), including entries of pairings reflective of connectivity checking operations. Processing of the flow diagram of FIG. 3D is complete as indicated by process block 349.

Figure 3E:
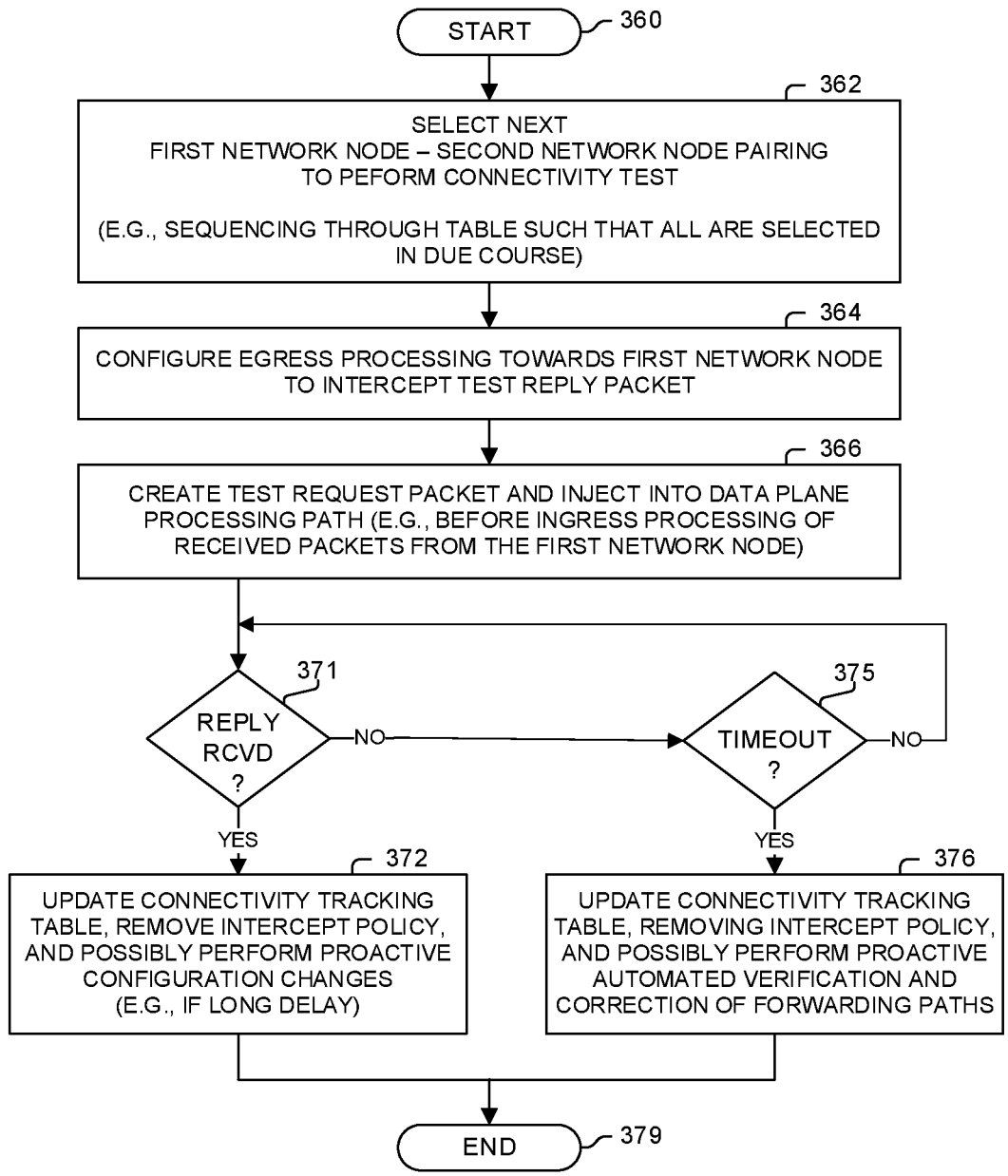
FIG. 3E illustrates a process performed according to one embodiment.

FIG. 3E illustrates a process performed in one embodiment. Processing begins with process block 360. In process block 362, a next first network node to second network node pairing (e.g., from table 320 (FIG. 3C)) is selected on which to perform connectivity verification. In one embodiment, entries of node-node connectivity tracking table are sequenced through in some manner such that all are selected in due course. One embodiment linearly sequences through these entries, uses a timing wheel or other scheduling mechanism.

In process block 364, egress processing communicatively coupling packet switching device with the first network node is configured to intercept a corresponding echo reply connectivity test packet (e.g., via an access control list entry or other packet inspection mechanism). In one embodiment, this egress information is acquired from a corresponding entry in a node information tracking table (e.g., table 310 of FIG. 3B).

In process block 366, packet switching device 400 creates a connectivity test echo request packet including one or more headers (e.g., MAC, IP), with at least one header including a corresponding source address of the first network node and destination address of the second network node. In one embodiment, the connectivity test echo request packet is marked in a manner such that a connectivity test echo reply packet received from second network node can be distinguished as being responsive to a test echo request packet created by the packet switching device, and not created by the first network node. In one embodiment, this marking includes an IP address of packet switching device 400 and/or other information (e.g., a flag, a timestamp, a nonce value). The created connectivity test echo request packet is injected into the data plane processing path of the packet switching device, typically before ingress processing that would be performed on packets received from the first network node.

As determined in process block 371, if a connectivity test echo reply packet is received in response to a created and sent connectivity test echo request packet by the packet switching device, then processing proceeds to process block 372; otherwise, processing proceeds to process block 375. As determined in process block 375, if a timeout has occurred before receipt of a connectivity test echo reply packet being received in response to a created and sent connectivity test echo request packet by the packet switching device, then processing proceeds to process block 376; otherwise, processing returns to process block 371.

Continuing with process block 372, the node-node connectivity tracking table (e.g., table 320 of FIG. 3C) is updated. In one embodiment, the egress intercept policy (e.g., instantiated in process block 364) is removed or suspended. In one embodiment, the packet switching device performs proactive configuration changes, such as, but not limited to, in response to a long delay in receiving the connectivity test echo reply packet and/or excess jitter (e.g., determined based on other connectivity verification tests). Processing proceeds to process block 379.

Continuing with process block 376, the node-node connectivity tracking table (e.g., table 320 of FIG. 3C) is updated to reflect the timeout. In one embodiment, the egress intercept policy (e.g., instantiated in process block 364) is removed or suspended. In one embodiment, the packet switching device performs proactive configuration changes, such as, but not limited to, automated verification and correction of forwarding paths within the packet switching device and/or other devices in the network, additional route or other advertisements, communication with a path computation engine or other network management device. Processing proceeds to process block 379.

Processing of the flow diagram of FIG. 3E is complete as indicated by process block 379.

Each of FIGS. 4A-H and 5A-D illustrate operations performed, data structure(s), architecture(s) and/or other features and functionality of one embodiment of a packet switching device.

Each of FIGS. 4A-H illustrate packet flows from first network node 411 through packet switching device 400 to second network node 412, and packet flows (in the opposite direction) from second network node 412 through packet switching device 400 to first network node 411. These flows are further labeled with consecutive letters for ease of reference by a reader. As shown, first network node 411's interface N1 has a MAC address of "N1-M" and IP address of "N1-IP;" and second network node 412's interface N4 has a MAC address of "N4-M" and IP address of "N4-IP;" and In each of FIGS. 4A-F, packet switching device 400 receives (A) on interface 401 a packet from first network node 411. The received packet is provided (B) to ingress processing 402 (e.g., classification, policing, marking, determining forwarding information) with the forwarding information identifying to send out interface 405. The packet is thus communicated (C) to intercommunications and shared packet buffers 409, then provided (D) to egress processing 407 (e.g., encapsulation if determined, identifying nexthop information) and then provided (E) to egress interface 405, which forwards (F) the packet to second network node 412. In the reverse direction between nodes 412 and 411, packet switching device 400 receives (G) on interface 405 a packet from second network node 412. The received packet is provided (H) to ingress processing 406 (e.g., classification, policing, marking, determining forwarding information) with the forwarding information identifying to send out interface 401. The packet is thus communicated (I) to intercommunications and shared packet buffers 409, then provided (J) to egress processing 403 (e.g., encapsulation if determined, identifying nexthop information) and then provided (K) to egress interface 401, which forwards (L) the packet to first network node 411.

Figure 4A:
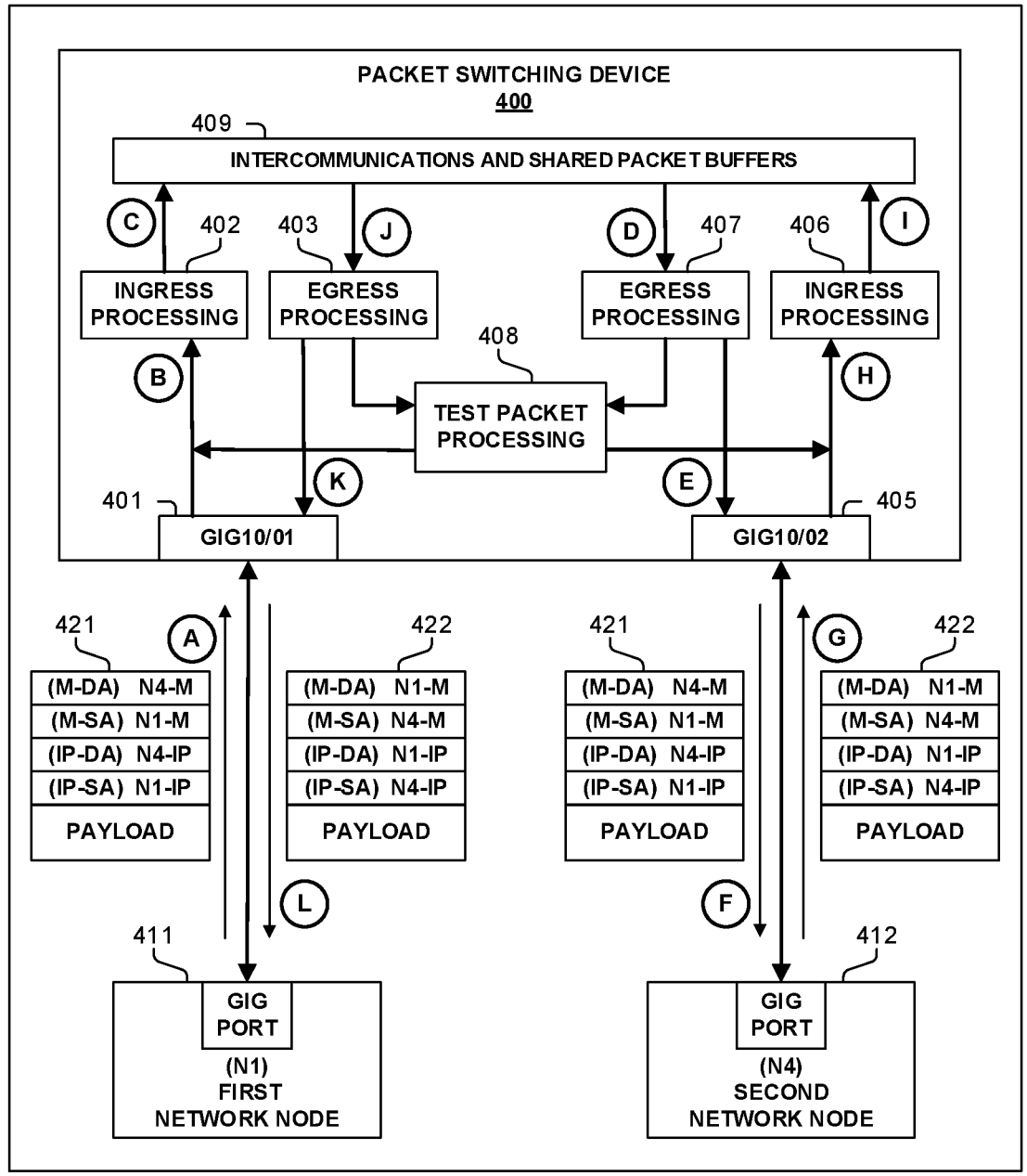
FIGS. 4A-4H, each of these figures illustrates packet processing in a packet switching device and network according to one embodiment.

FIG. 4A illustrates packet switching device 400 operating according to one embodiment, including receiving and processing an Ethernet packet 421 (that encapsulates an IP packet in one embodiment) received on interface 401 from first network node 411 and subsequently sent out interface 405 to second network node 412; and in the reverse direction, including receiving and processing an Ethernet packet 422 (that encapsulates an IP packet in one embodiment) received on interface 405 from second network node 412 and subsequently sent out interface 401 to first network node 411.

Figure 4B:
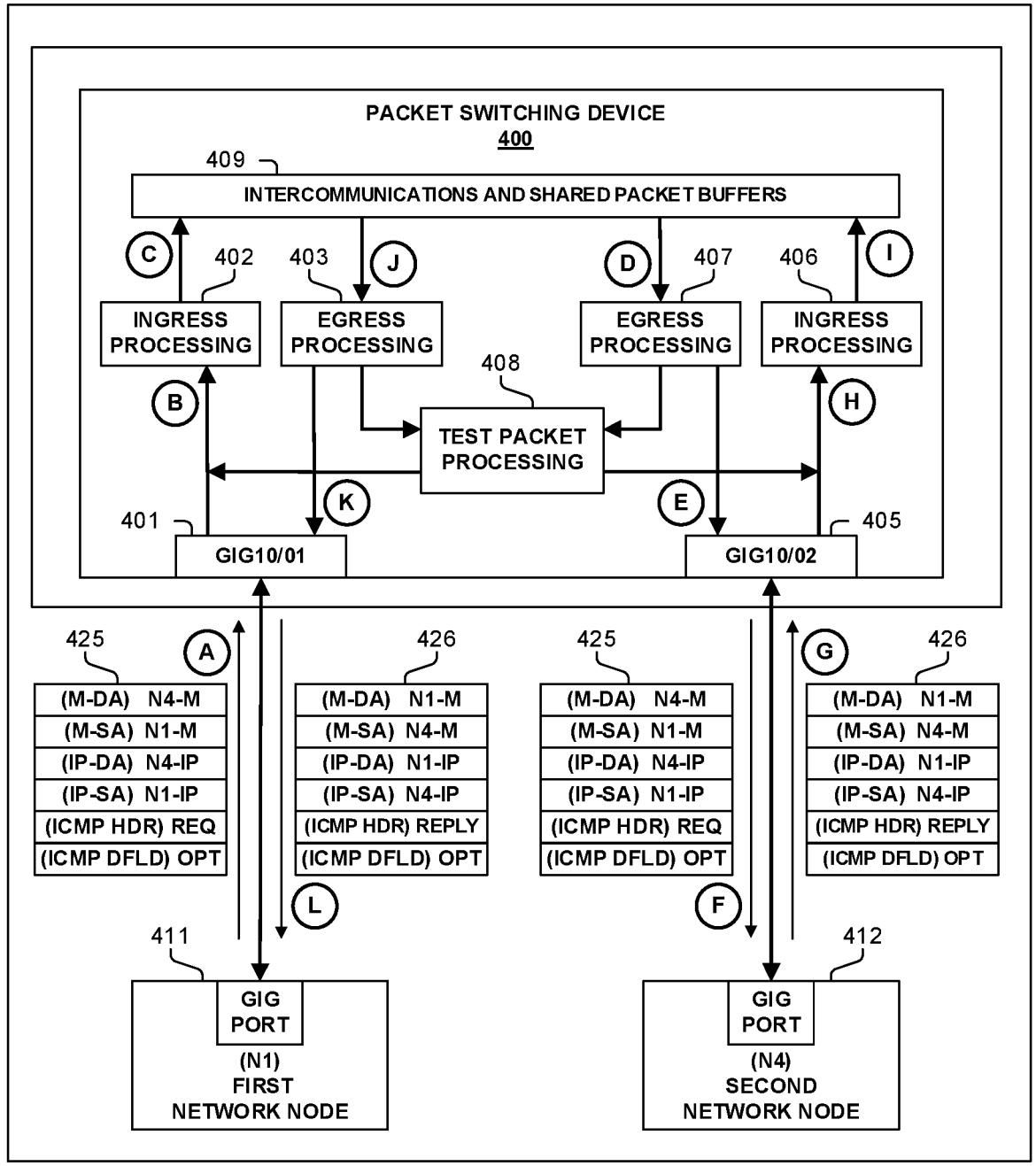

FIG. 4B illustrates packet switching device 400 operating according to one embodiment, including receiving and processing an Ethernet packet 425 (that encapsulates an ICMP echo request message) received on interface 401 from first network node 411 and subsequently sent out interface 405 to second network node 412; and in the reverse direction, including receiving and processing an Ethernet packet 426 (that encapsulates an ICMP echo reply message) received on interface 405 from second network node 412 and subsequently sent out interface 401 to first network node 411. In one embodiment, an ICMP echo reply message (426) is not filtered by packet switching device 400 as a corresponding filtering mechanism is currently not active or the ICMP echo reply message (426) does not have a marking (e.g., in the optional data field of the ICMP echo reply messages) to indicate that this message is in response to an ICMP echo request message created by, and sent from, packet switching device 400 (such as illustrated in each of FIGS. 5A-D and pervasively described herein).

Figure 4C:
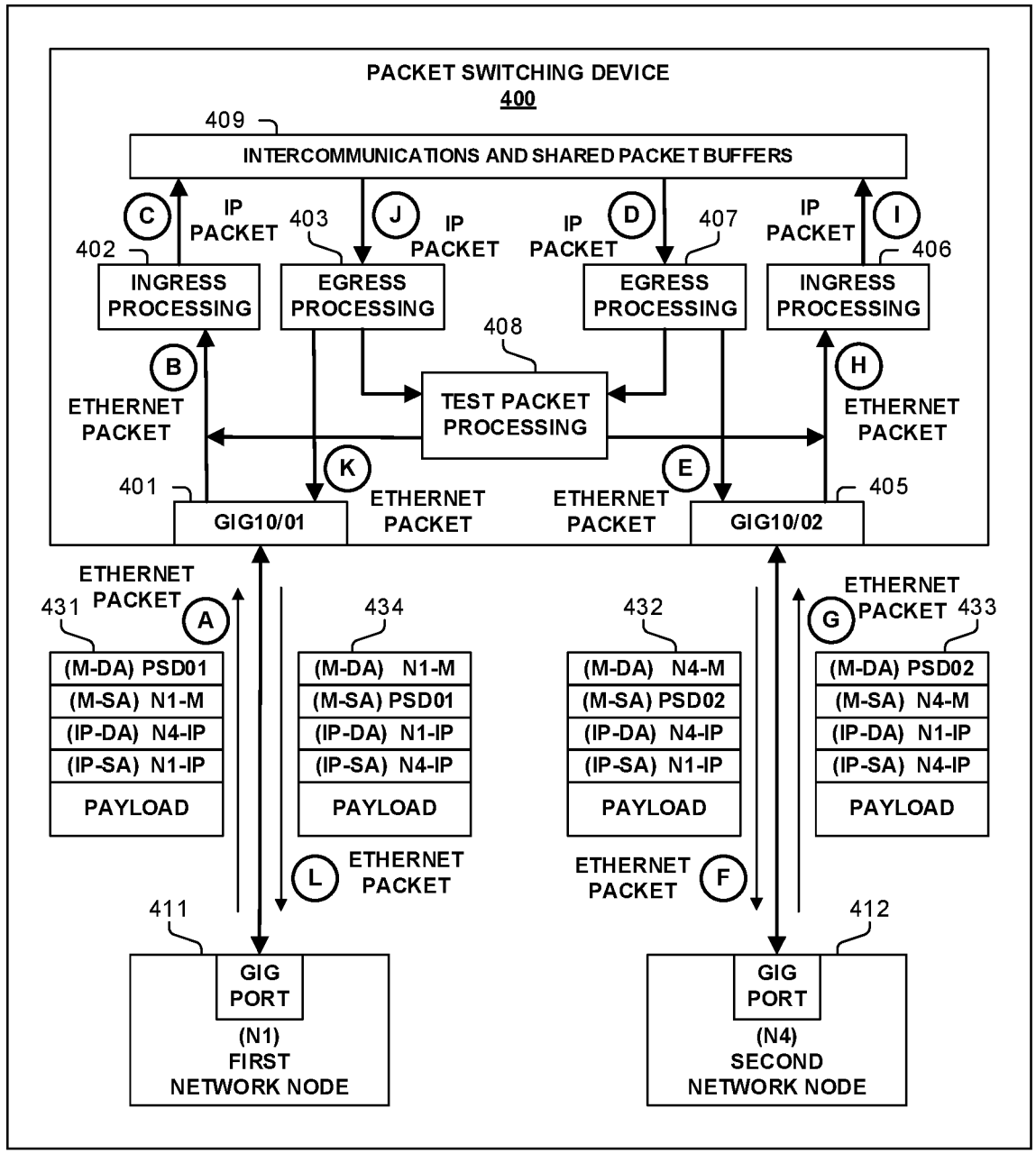

FIG. 4C illustrates packet switching device 400 operating according to one embodiment, including processing Ethernet packets 431 (encapsulating IP packets) received (A) on interface 401 (having a MAC address of PSD01) from first network node 411. Received Ethernet packet 431 is provided (B) to ingress processing 402 (e.g., classification, policing, marking, determining forwarding information). As Ethernet packet 431 is addressed to packet switching device 400, the IP packet is decapsulated and then further ingress processed (402), with the resultant forwarding information identifying to send it out of interface 405. Thus, the IP packet is communicated (C, D) to egress processing 407 (as it is associated with egress interface 405) via intercommunications and shared packet buffers 409. Egress processing 407 identifies next hop information being directly connected second network node 412, thus, the IP packet is encapsulated and appropriately addressed in Ethernet packet 432, which is communicated (E) to egress interface 405, and sent (F) to second network node 412.

FIG. 4C further illustrates packet switching device 400 operating according to one embodiment, including processing Ethernet packets 433 (encapsulating IP packets) received (G) on interface 405 (having a MAC address of PSD02) from second network node 412. The received packet is provided (H) to ingress processing 406 (e.g., classification, policing, marking, determining forwarding information). As Ethernet packet 433 is addressed to packet switching device 400, the IP packet is decapsulated and then further ingress processed (406), with the resultant forwarding information identifying to send it out of interface 401. Thus, the IP packet is communicated (I, J) to egress processing 403 (as it is associated with egress interface 401) via intercommunications and shared packet buffers 409. Egress processing 403 identifies next hop information being directly connected first network node 411, thus, the IP packet is encapsulated and appropriately addressed in Ethernet packet 434, which is communicated (K) to egress interface 401, and sent (K) to first network node 411.

Figure 4D:
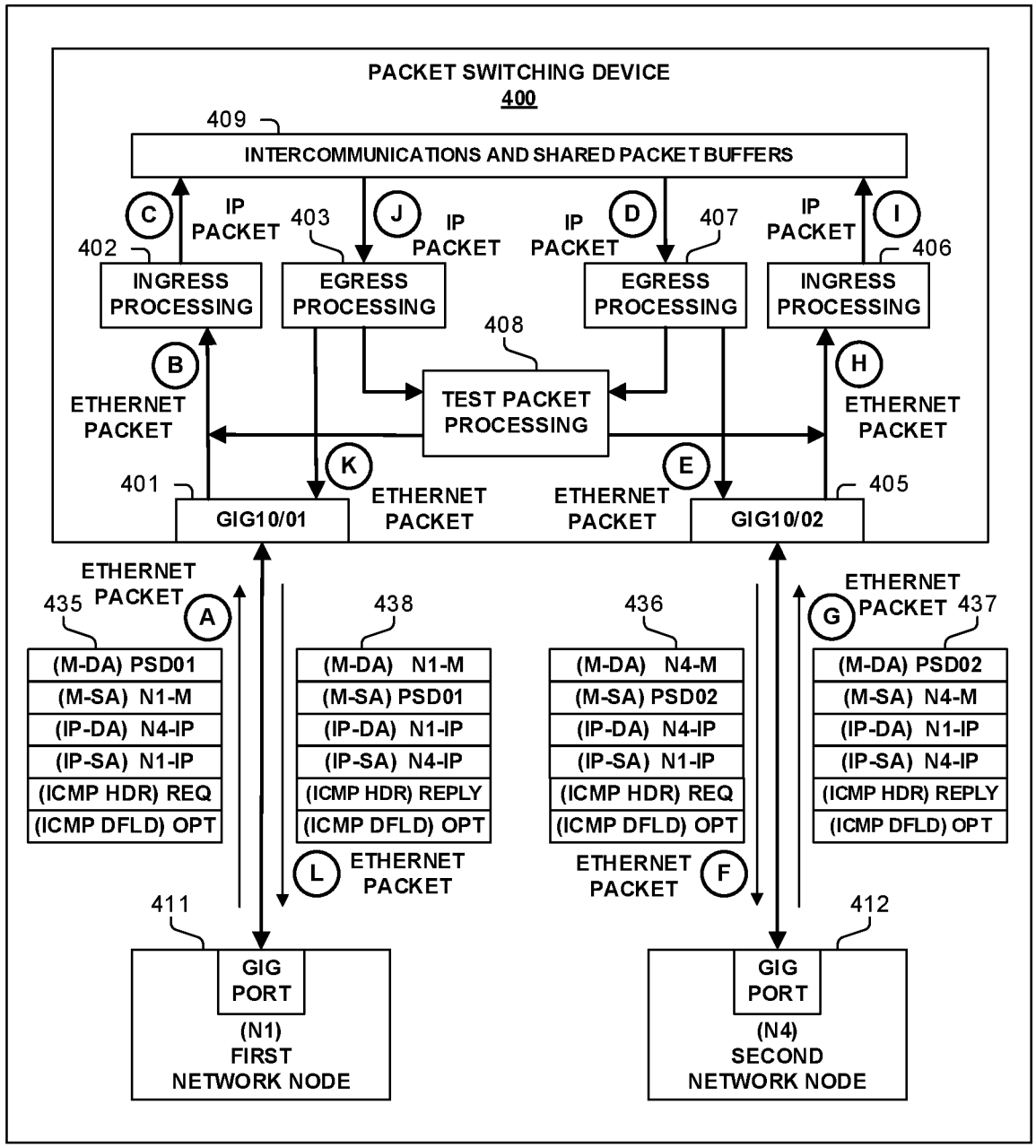

FIG. 4D illustrates packet switching device 400 operating according to one embodiment and similarly to that illustrated in, and described in relation to, FIG. 4C, but with each of the IP packets encapsulated in Ethernet packets 435-438 including an ICMP echo request or reply message. In one embodiment, an ICMP echo reply message (437, 438) is not filtered by packet switching device 400 as a corresponding filtering mechanism is currently not active or the ICMP echo reply message (437, 438) does not have a marking (e.g., in the optional data field of the ICMP echo reply messages) to indicate that this message is in response to an ICMP echo request message created by, and sent from, packet switching device 400 (such as illustrated in each of FIGS. 5A-D and pervasively described herein).

Figure 4E:
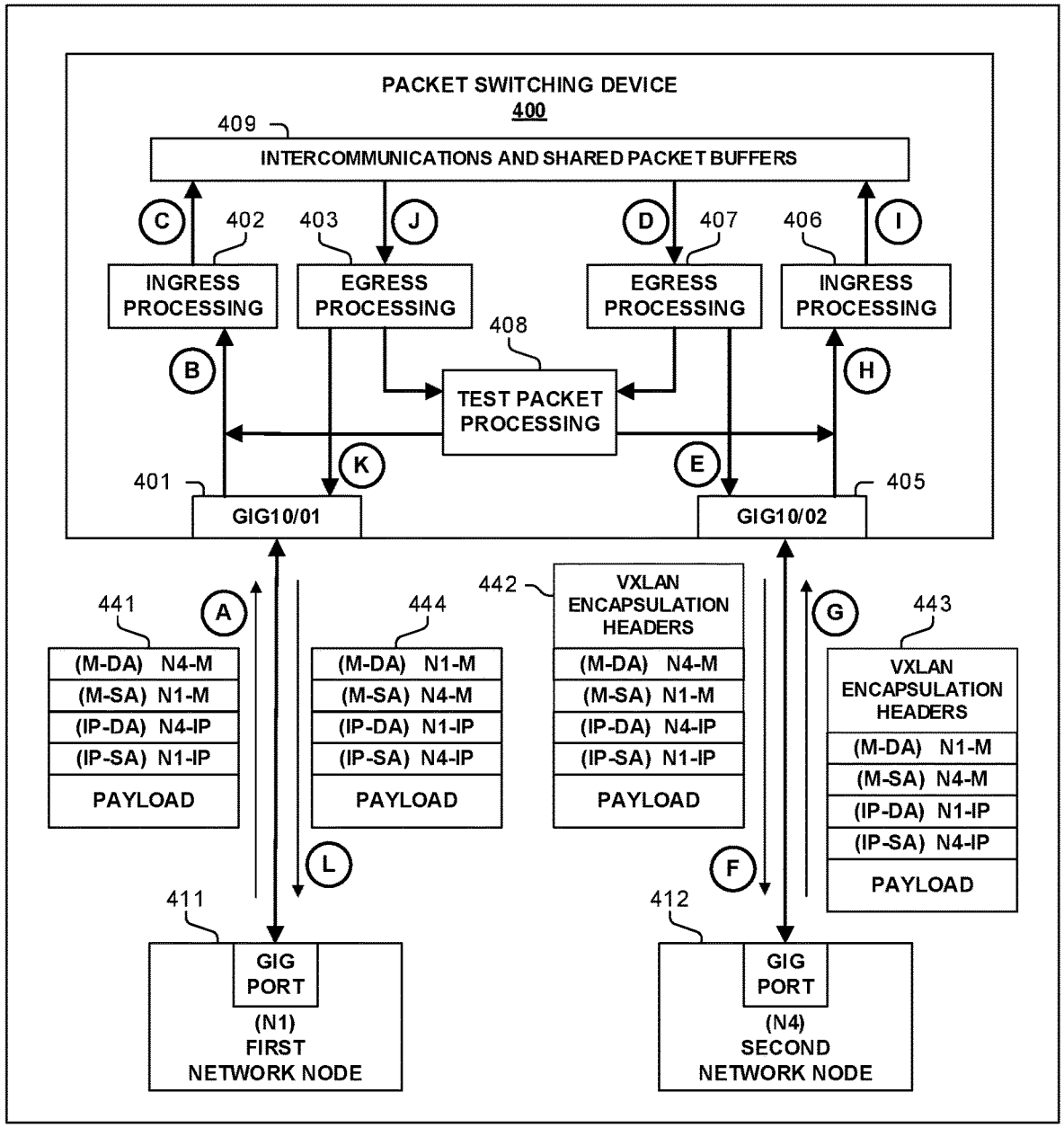

FIG. 4E illustrates packet switching device 400 operating according to one embodiment, including processing Ethernet packets 441 (encapsulating an IP packets) received on interface 401 from first network node 411. Received Ethernet packets 441 are provided to ingress processing 402 (e.g., classification, policing, marking, determining forwarding information), with the resultant forwarding information identifying to send it out of interface 405. Thus, Ethernet packets 441 are communicated to egress processing 407 (as it is associated with egress interface 405) via intercommunications and shared packet buffers 409. Egress processing 407 of packets 441 results in VXLAN encapsulating packets 442, which are sent out interface 405 to second network node 412. In the reverse direction, VXLAN encapsulating packets 443 are received on interface 405 of packet switching device 400, with ingress processing 406 decapsulating Ethernet packets 441 (that include encapsulated IP packets), with these Ethernet packets 444 being sent out interface 401 to first network node 411.

Figure 4F:
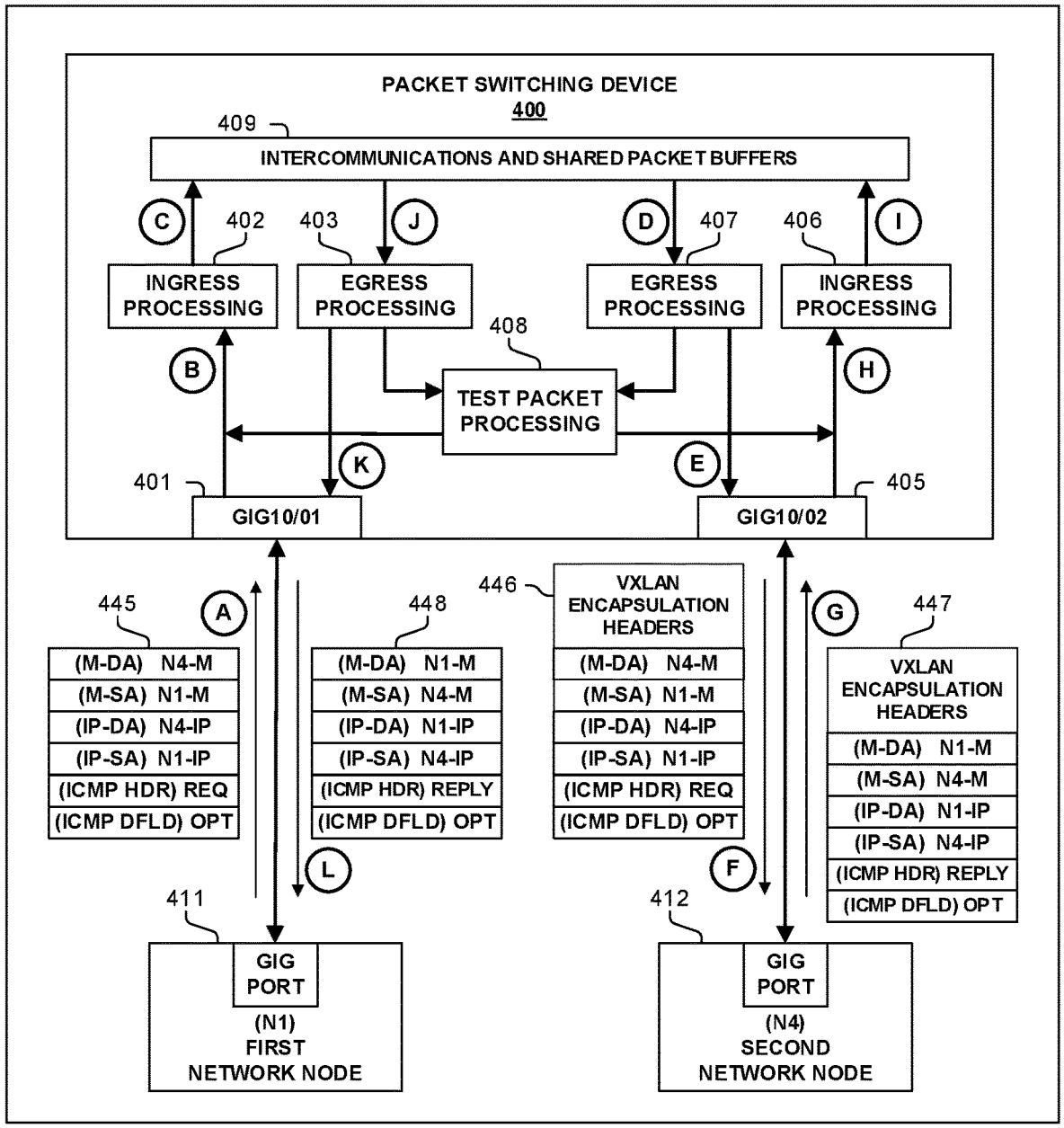

FIG. 4F illustrates packet switching device 400 operating according to one embodiment and similarly to that illustrated in, and described in relation to, FIG. 4E, but with the IP packets encapsulated in packets 445-448 including ICMP echo request or reply messages. In one embodiment, an ICMP echo reply message (447, 448) is not filtered by packet switching device 400 as a corresponding filtering mechanism is currently not active or the ICMP echo reply message (447, 448) does not have a marking (e.g., in the optional data field of the ICMP echo reply messages) to indicate that this message is in response to an ICMP echo request message created by, and sent from, packet switching device 400 (such as illustrated in each of FIGS. 5A-D and pervasively described herein).

Figure 4G:
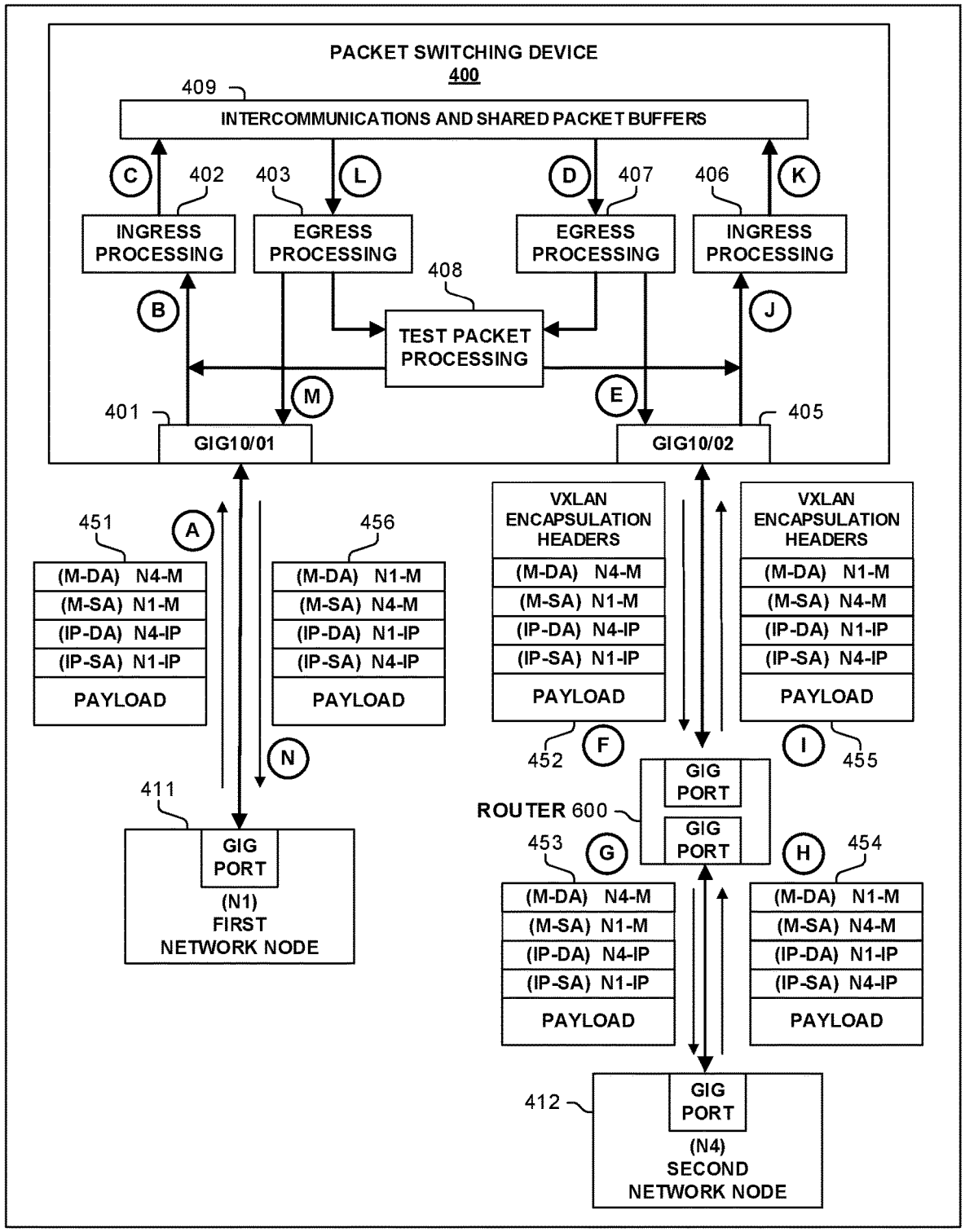

FIG. 4G illustrates packet switching device 400 (e.g., a VTEP edge node) operating according to one embodiment, including communicating Ethernet packets 451 (encapsulating IP packets) received on interface 401 from first network node 411, egress processing 407 resulting in VXLAN encapsulating packets 452, that are sent out interface 405 towards second network node 412 via router 600 (e.g., a VTEP edge node). Router 600 removes the VXLAN encapsulation resulting in packets 453 forwarded to second network node 412. In the reverse direction, Ethernet packets 454 are sent from second network node 412 to first network node 411 via router 600 (e.g., a VTEP edge node). Router 600 adds corresponding VXLAN encapsulation and forwards resultant packets 455 to packet switching device 400 (e.g., a VTEP edge node). VXLAN encapsulating packets 455 are received on interface 405 of packet switching device 400, with ingress processing 406 decapsulating Ethernet packets 456 (that include encapsulated IP packets) that are sent out interface 401 to first network node 411.

Figure 4H:
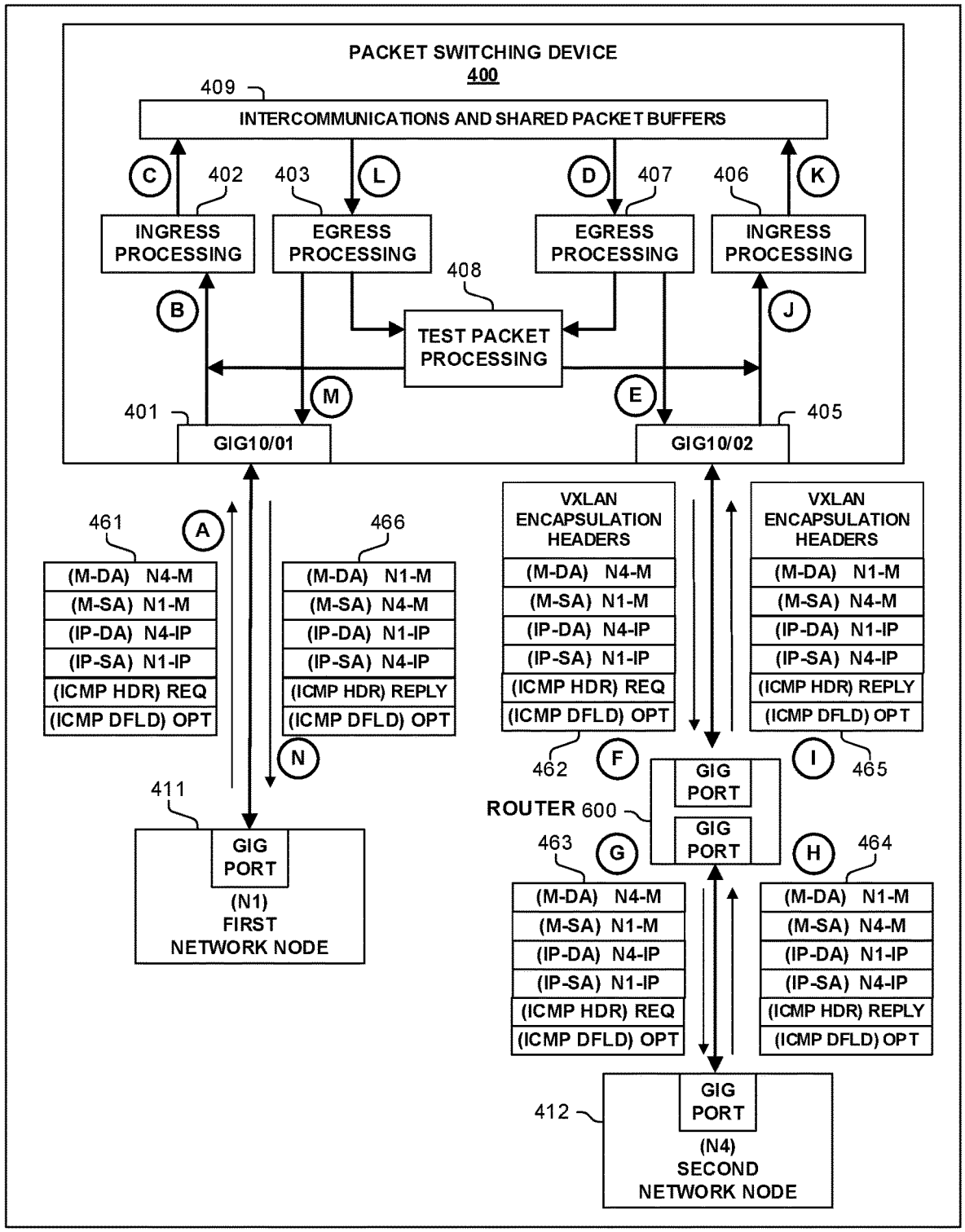

FIG. 4H illustrates packet switching device 400 operating according to one embodiment and similarly to that illustrated in, and described in relation to, FIG. 4G, but with each of the IP packets encapsulated in packets 461-466 including an ICMP echo request or reply message. In one embodiment, an ICMP echo reply message (465, 466) is not filtered by packet switching device 400 as a corresponding filtering mechanism is currently not active or the ICMP echo reply message (465, 466) does not have a marking (e.g., in the optional data field of the ICMP echo reply messages) to indicate that this message is in response to an ICMP echo request message created by, and sent from, packet switching device 400 (such as illustrated in each of FIGS. 5A-D and pervasively described herein).

FIGS. 5A-5D, each of these figures illustrates packet processing in a packet switching device in a network according to one embodiment. These FIGS. 5A-D correspond, respectively to FIGS. 4B, 4D, 4F, and 4H. However, in each of FIGS. 5A-D, the ICMP echo request connectivity test packets are created by packet switching device 400, with these packets emulating packets being sent from first network node 411 and injected into the data path processing of packet switching device 400 prior to ingress processing 402. Similarly, however, in each of FIGS. 5A-D, the ICMP echo reply connectivity test packets (sent from second network node 412) are intercepted by egress processing 403 that is associated with interface 401 from which packets are sent to first network node 411. In these manners, more complete forwarding paths between first network node 411 and second network node 412 are verified by packet switching device 400. Thus, providing improvements to packet switching device 400.

Figure 5A:
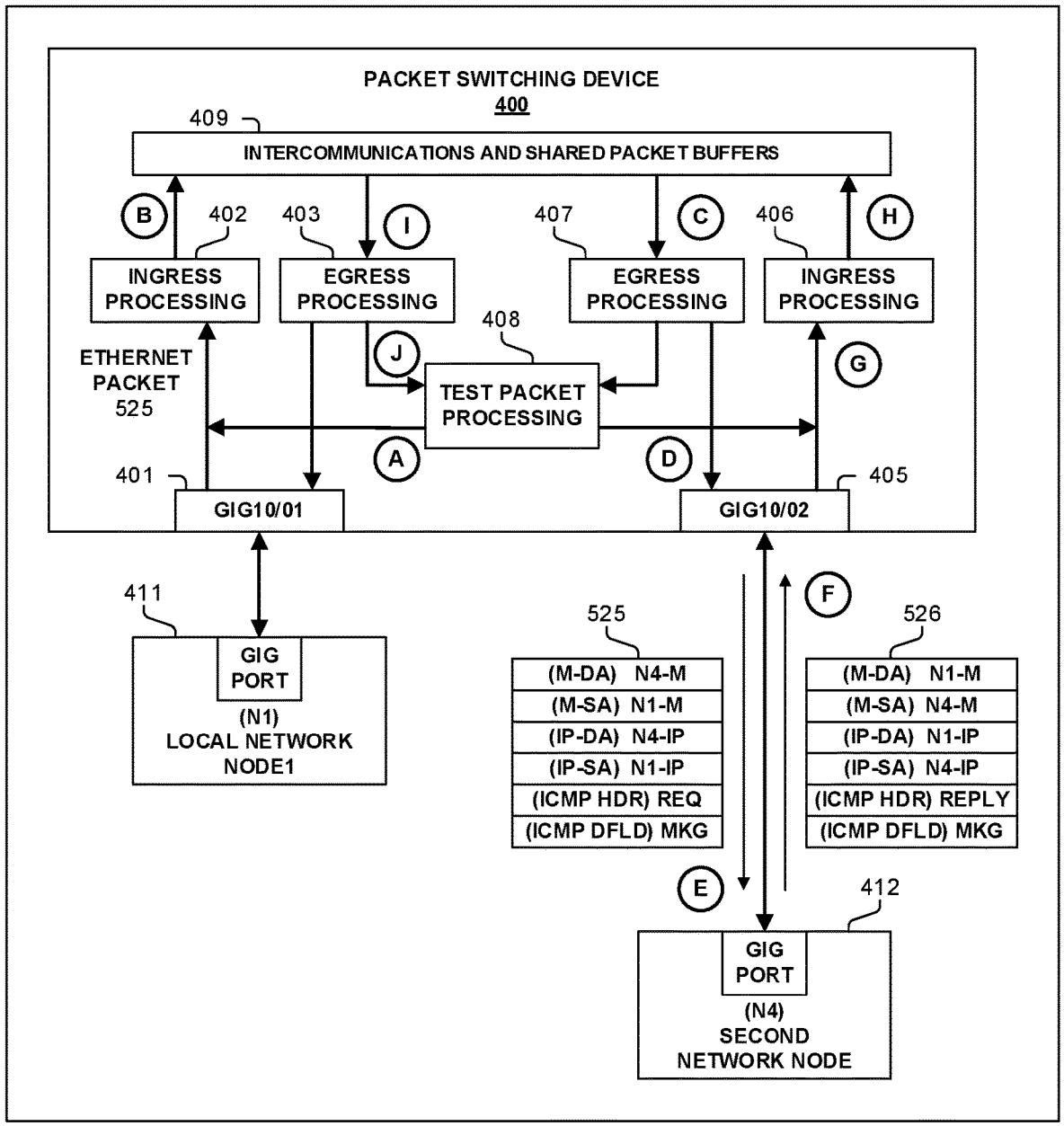
FIGS. 5A-5D, each of these figures illustrates packet processing in a packet switching device and network according to one embodiment.

FIG. 5A illustrates packet switching device 400 operating according to one embodiment, including creating, intercepting, and consuming connectivity test packets in checking forwarding paths between first network node 411 and second network node 412. Test packet processing 408 (e.g., one or more processors with memory) generates Ethernet packet 525 (including an ICMP echo request message) that is an emulation of packet 425 of FIG. 4B; except, in one embodiment, packet 525 includes some marking (illustrated as MKG/marking in the DFLD/data field of the ICMP echo request message) which will be returned in a corresponding ICMP echo reply message (526). This marking is used to identify a received ICMP echo reply message is being in response to an ICMP echo request message generated by packet switching device 400, in contrast to one generated by first network node 411. In one embodiment, this marking includes an IP address of packet switching device 400 and/or other information (e.g., a flag, a timestamp, a nonce value).

As shown in FIG. 5A, packet 525 is created by test packet processing 408; communicated to (A), and processed by, ingress processing 402; communicated to (B, C), and processed by, egress processing 407; communicated to (D) interface 405; and sent from (E) interface 405 to second network node 412.

In response to the received packet 525 including the ICMP echo request message, second network node 412 creates and sends (F) to packet switching device 400 packet 526 including the ICMP echo reply message. After receipt on interface 405, packet switching device 400 communicates (G) packet 526 to ingress processing 406 that processes the packet including determining to forward to interface 401 for sending to first network node 411. As egress processing 403 is associated with interface 401, packet 526 is communicated to (H, I) egress processing 403, which determines to intercept packet 526 including the ICMP echo reply message, resulting in it being forwarded to (J) test packet processing 408.

Responsive to the received intercepted packet 526, test packet processing 408 updates the node-node connectivity tracking table (e.g., table 320 of FIG. 3C) and causes the egress intercept policy (e.g., instantiated in process block 364 of FIG. 3E) is typically removed, and proactive configuration changes are possibly performed, such as, but not limited to, in response to a long delay in receiving the connectivity test echo reply packet and/or excess jitter (e.g., determined based on other connectivity verification tests). In one embodiment, if test packet processing 408 determines that ICMP echo reply message in packet 526 does not correspond to an ICMP echo request generated by packet switching device 400, packet 526 including the ICMP echo reply message is returned to, and processed by egress processing 403, with the resultant processed packet being sent from interface 401 to first network node 411.

Figure 5B:
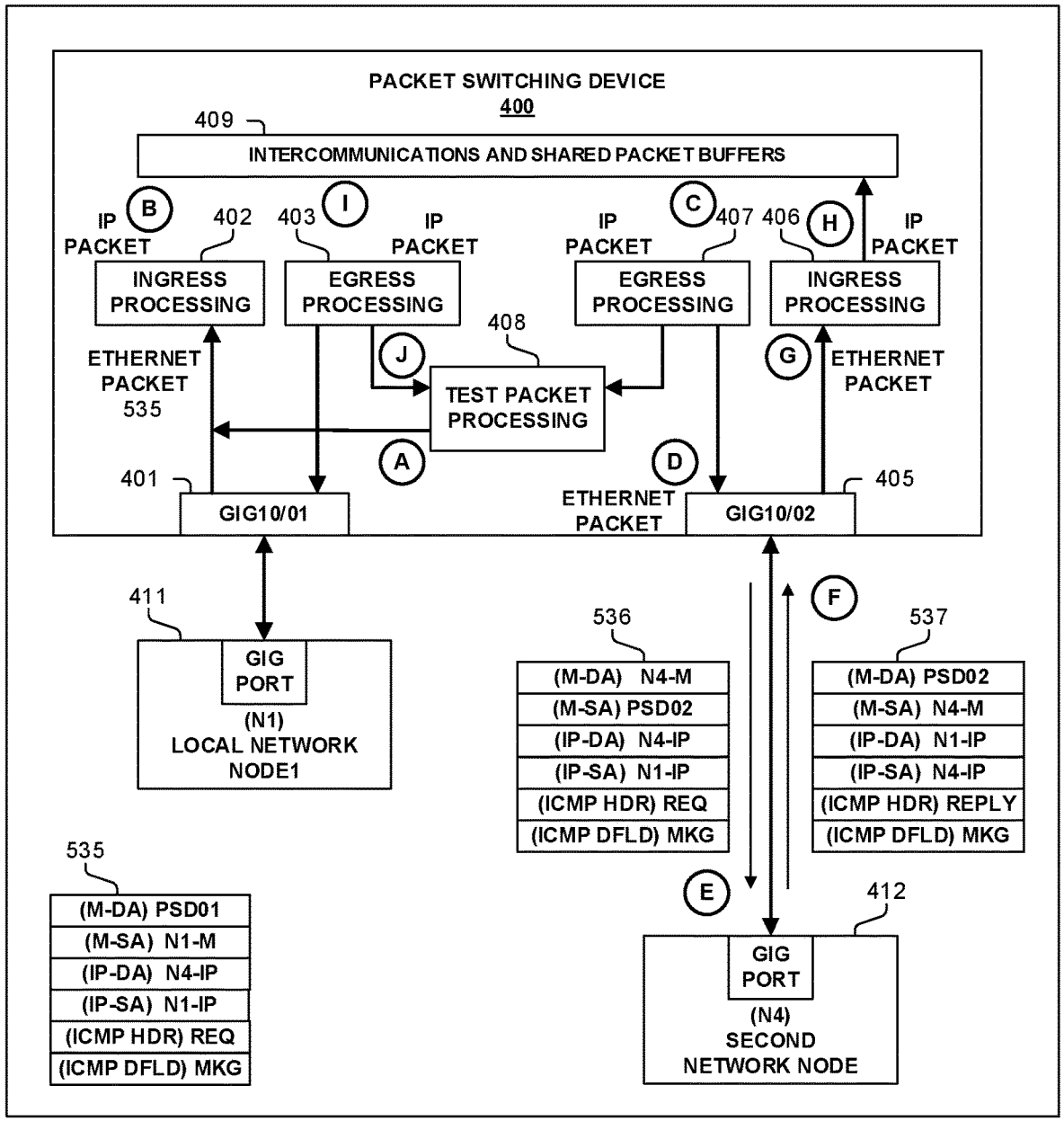

FIG. 5B illustrates packet switching device 400 operating according to one embodiment, including creating, intercepting, and consuming connectivity test packets in checking forwarding paths between first network node 411 and second network node 412. Test packet processing 408 (e.g., one or more processors with memory) generates an Ethernet packet 535 (including an ICMP echo request message) that is an emulation of packet 435 of FIG. 4D; except, in one embodiment, created packet 535 includes some marking (illustrated as MKG/marking in the DFLD/data field of the ICMP echo request message) which will be returned in a corresponding ICMP echo reply message (537).

As shown in FIG. 5B, Ethernet packet 535 including the ICMP echo request message is created by test packet processing 408; communicated to (A), and processed by, ingress processing 402 that decapsulates the IP packet (including the ICMP echo request message) and determines to forward the decapsulated IP packet to egress interface 405. Thus, the IP packet is communicated to (B, C), and processed by, egress processing 407 resulting in packet 536 which is communicated to (D) interface 405 and sent (E) to second network node 412.

In response to the received packet 536 including the ICMP echo request message, second network node 412 creates and sends (F) to packet switching device 400 packet 537 including the ICMP echo reply message. After receipt on interface 405, packet switching device 400 communicates (G) Ethernet packet 537 to ingress processing 406 that processes the packet including decapsulating the IP packet including the ICMP echo response packet, and determines to forward the IP packet to interface 401 for sending to first network node 411. As egress processing 403 is associated with interface 401, the IP packet is communicated to (H, I) egress processing 403, which determines to intercept the packet with the ICMP echo request message and communicates (J) this packet to test packet processing 408. In one embodiment, egress processing 403 encapsulates the IP packet in an Ethernet packet for sending to first network node 411 prior to determining to intercept the packet, with the Ethernet packet being communicated (J) to test packet processing 408. In one embodiment, egress processing 403 does not encapsulate the IP packet in an Ethernet packet for sending to first network node 411 prior to determining to intercept the packet, with the IP packet being communicated (J) to test packet processing 408.

Responsive to the received intercepted packet including the ICMP echo request message, test packet processing 408 updates the node-node connectivity tracking table (e.g., table 320 of FIG. 3C) and causes the egress intercept policy (e.g., instantiated in process block 364 of FIG. 3E) is typically removed, and proactive configuration changes are possibly performed, such as, but not limited to, in response to a long delay in receiving the connectivity test echo reply packet and/or excess jitter (e.g., determined based on other connectivity verification tests). In one embodiment, if test packet processing 408 determines that ICMP echo reply message does not correspond to an ICMP echo request generated by packet switching device 400, the packet including the ICMP echo reply message is returned to, and processed by egress processing 403, with the resultant processed packet being sent from interface 401 to first network node 411.

Figure 5C:
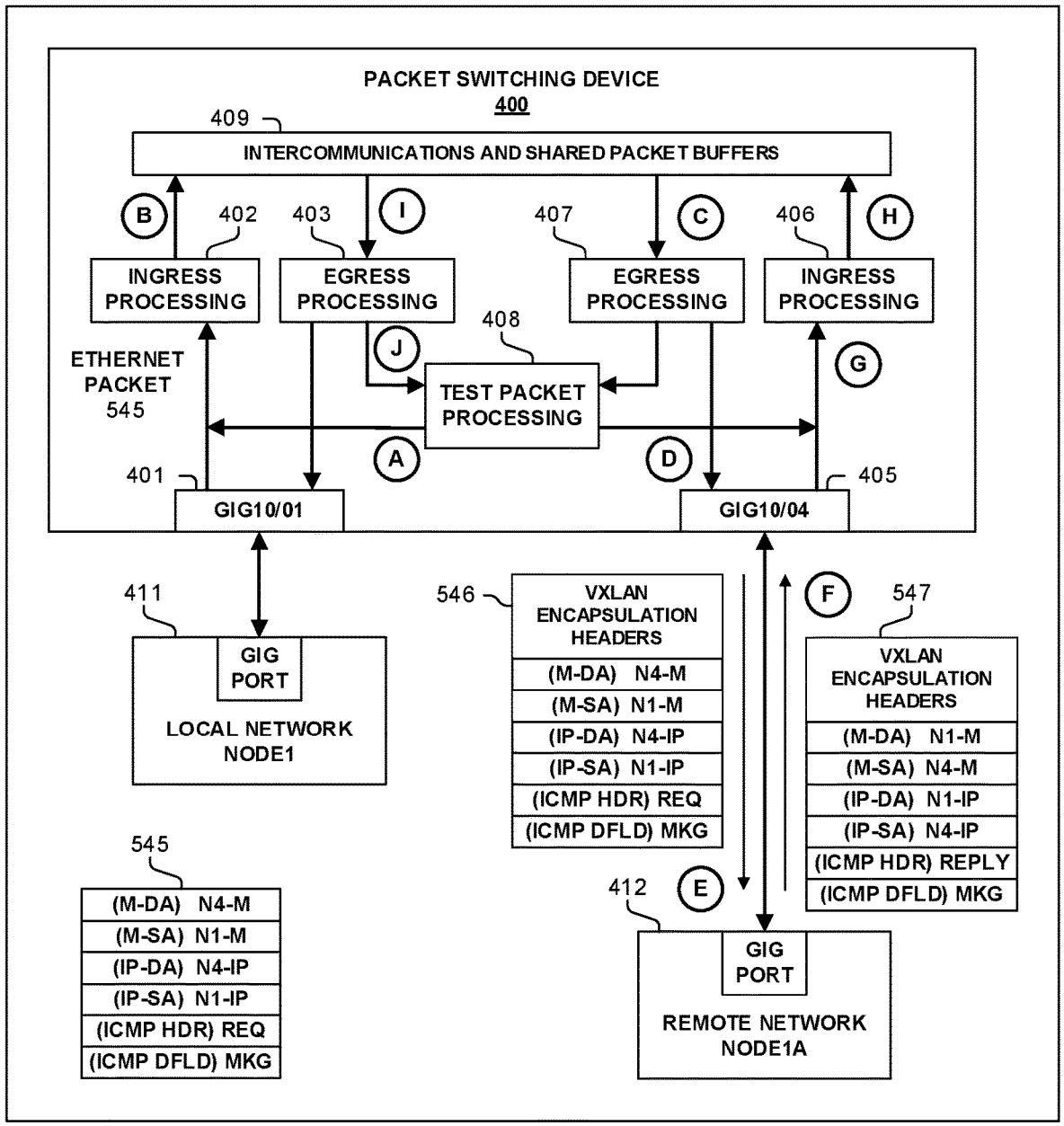

FIG. 5C illustrates packet switching device 400 operating according to one embodiment, including creating, intercepting, and consuming connectivity test packets in checking forwarding paths between first network node 411 and second network node 412. Test packet processing 408 (e.g., one or more processors with memory) generates Ethernet packet 545 (including an ICMP echo request message) that is an emulation of packet 445 of FIG. 4F; except, in one embodiment, the ICMP echo request message includes some marking (illustrated as MKG/marking in the DFLD/data field of the ICMP echo request message which will be returned in a corresponding ICMP echo reply message).

As shown in FIG. 5C, created Ethernet packet 545 is communicated to (A), and processed by, ingress processing 402, with the ingress processed packet communicated to (B, C) egress processing 407 resulting in VXLAN encapsulating packet 546, that is communicated to (D) and sent out (E) interface 405 to second network node 412.

In response to the received VXLAN packet 546 including the ICMP echo request message, second network node 412 creates and sends (F) to packet switching device 400 VXLAN packet 547 including the ICMP echo reply message. After receipt on interface 405, packet switching device 400 communicates (G) received VXLAN packet 547 to ingress processing 406 that processes VXLAN packet 547 including decapsulating the Ethernet packet including the ICMP echo response packet, and determines to forward the decapsulated packet to interface 401 for sending to first network node 411. As egress processing 403 is associated with interface 401, the decapsulated packet is communicated to (H, I) egress processing 403, which determines to intercept the packet with the ICMP echo request message and communicates (J) this packet to test packet processing 408.

Responsive to the received intercepted packet including the ICMP echo request message, test packet processing 408 updates the node-node connectivity tracking table (e.g., table 320 of FIG. 3C) and causes the egress intercept policy (e.g., instantiated in process block 364 of FIG. 3E) is typically removed, and proactive configuration changes are possibly performed, such as, but not limited to, in response to a long delay in receiving the connectivity test echo reply packet and/or excess jitter (e.g., determined based on other connectivity verification tests). In one embodiment, if test packet processing 408 determines that ICMP echo reply message does not correspond to an ICMP echo request generated by packet switching device 400, the packet including the ICMP echo reply message is returned to, and processed by egress processing 403, with the resultant processed packet being sent from interface 401 to first network node 411.

Figure 5D:
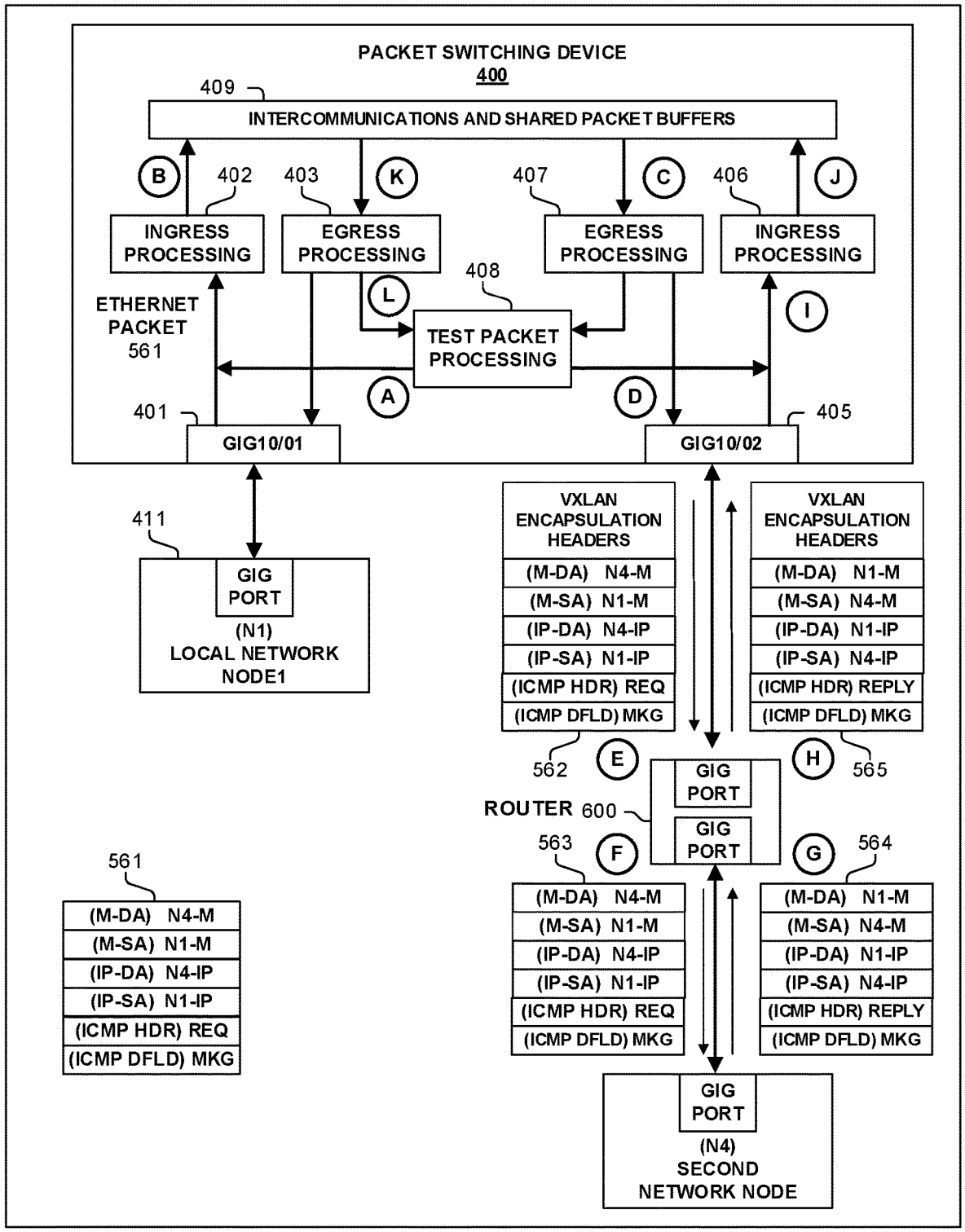

FIG. 5D illustrates packet switching device 400 operating according to one embodiment, including creating, intercepting, and consuming connectivity test packets in checking forwarding paths between first network node 411 and second network node 412. Test packet processing 408 (e.g., one or more processors with memory) generates Ethernet packet 561 (including an ICMP echo request message) that is an emulation of packet 461 of FIG. 4H; except, in one embodiment, the ICMP echo request message includes some marking (illustrated as MKG/marking in the DFLD/data field of the ICMP echo request message which will be returned in a corresponding ICMP echo reply message).

As shown in FIG. 5D, created Ethernet packet 561 is communicated to (A), and processed by, ingress processing 402, with the ingress processed packet communicated to (B, C) egress processing 407 resulting in VXLAN encapsulating packet 562, that is communicated to (D) and sent out (E) interface 405 towards second network node 412 via router 600 (e.g., a VTEP edge node). Router 600 removes the VXLAN encapsulation of packet 562 resulting in packet 563 forwarded to (F) second network node 412.

In response to the received packet 563 including the ICMP echo request message, second network node 412 creates and sends (G) Ethernet packet 564 towards first network node 411 via router 600 (e.g., a VTEP edge node). Router 600 adds corresponding VXLAN encapsulation and forwards (H) resultant VXLAN packet 565 to packet switching device 400 (e.g., a VTEP edge node). After receipt on interface 405, packet switching device 400 communicates (I) the received VXLAN packet 565 to ingress processing 406 that processes VXLAN packet 565 including decapsulating the Ethernet packet including the ICMP echo response packet, and determines to forward the decapsulated Ethernet packet to interface 401 for sending to first network node 411. As egress processing 403 is associated with interface 401, the decapsulated Ethernet packet is communicated to (J, K) egress processing 403, which determines to intercept the Ethernet packet including the ICMP echo request message and communicates (L) this Ethernet packet to test packet processing 408.

Responsive to the received intercepted Ethernet packet including the ICMP echo request message, test packet processing 408 updates the node-node connectivity tracking table (e.g., table 320 of FIG. 3C) and causes the egress intercept policy (e.g., instantiated in process block 364 of FIG. 3E) is typically removed, and proactive configuration changes are possibly performed, such as, but not limited to, in response to a long delay in receiving the connectivity test echo reply packet and/or excess jitter (e.g., determined based on other connectivity verification tests). In one embodiment, if test packet processing 408 determines that ICMP echo reply message does not correspond to an ICMP echo request generated by packet switching device 400, the Ethernet packet including the ICMP echo reply message is returned to, and processed by egress processing 403, with the resultant processed Ethernet packet (including the ICMP echo reply message) being sent from interface 401 to first network node 411.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
receiving, on an ingress port of a plurality of ingress ports of a packet switching device, a first plurality of packets being sent in a network from a first network node through the packet switching device to a second network node, with each packet of the first plurality of packets including, in a header, a source address of the first network node and a destination address of the second network node;
creating, by the packet switching device, a second plurality of packets including one or more test echo request packets and the first plurality of packets, with each test echo request packet of the one or more test echo request packets including in a header, the source address of the first network node and the destination address of the second network node; and
for each packet of the second plurality of packets, a first network processor of a plurality of network processors of the packet switching device packet performing ingress processing on the respective packet including identifying a forwarding result, and sending the respective packet from the packet switching device after performing egress processing of the respective packet by a second network processor of the plurality of network processors -identified based on the forwarding result,
wherein the first network processor performs ingress processing on the one or more test echo request packets in response to the packet switching device ascertaining the first network processor will be processing the first plurality of packets or has processed at least one of the first plurality of packets,
wherein each of the second plurality of packets includes a network layer protocol packet, with the source address being a network protocol source address of the first network node, and with the destination address being a network protocol destination address of the second network node, and
wherein each of the second plurality of packets includes a data link layer packet encapsulation of the network layer protocol packet, with the data link layer packet including a data link level source address of the first network node and a data link level destination address of the second network node.

2. The method of claim 1, wherein the creating one or more test echo request packets is performed by the first processor of the packet switching device; and
wherein the method comprises the packet switching device response to ascertaining the first network processor will be processing the first plurality of packets or has processed at least one of the first plurality of packets, is communicating the one or more test echo request packets to the first network processor.

3. The method of claim 1, wherein the network layer protocol packet is Internet Protocol version 4 (IPv4) or Internet Protocol version 6 (IPv6).

4. The method of claim 1, each of the plurality of test echo request packets uses Internet Control Message Protocol (ICMP) or IPv6 Internet Control Message Protocol (ICMPv6).

5. The method of claim 1, further comprising:
intercepting, but not forwarding to the first network node, each echo reply connectivity test packet received by the packet switching device and corresponding to a sent one of the one or more test echo request packets, with the echo reply connectivity test packet including in a header, a source address of the second network node and a destination address of the first network node.

6. The method of claim 5, wherein at least one of the first plurality of packets includes a first node-generated test echo request packet being sent in the network from the first network node through the packet switching device to the second network node; and
wherein the method comprises packet processing each specific reply packet corresponding to the sent first node-generated test echo request packet received by the packet switching device, with the echo reply connectivity test packet including in a header, a source address of the second network node and a destination address of the first network node, and with the packet processing including forwarding the specific reply packet to the first network device.

7. The method of claim 6, wherein egress processing by a specific network processor of the plurality of network processors performs the intercepting, with the specific network processor associated with an egress port from which the packet switching device sends packets to the first network device.

8. The method of claim 5, wherein egress processing by a specific network processor of the plurality of network processors performs the intercepting, with the specific network processor associated with an egress port from which the packet switching device sends packets to the first network device.

9. The method of claim 8, further comprising configuring an access control list associated with the egress port to cause the intercepting of the each echo reply connectivity test packet received by the packet switching device and corresponding to the sent one of the created one or more test echo request packets.

10. The method of claim 8, wherein the egress processing of the respective packet includes Virtual eXtensible Local Area Network (VXLAN) or VXLAN Generic Protocol Extension (VXLAN-GPE) encapsulation; and
wherein the method includes the packet switching device removing VXLAN or VXLAN-GPE encapsulation of a received packet revealing the echo reply connectivity test packet received by the packet switching device and corresponding to the sent one of the created one or more test echo request packets.

11. The method of claim 8, further comprising configuring a filtering mechanism associated with the particular egress port to cause the intercepting of said each particular echo reply connectivity test packet received by the packet switching device and corresponding to the sent one of the created one or more test echo request packets.

12. A method, comprising:
responsive to a selecting a pairing of a plurality of first network nodes with plurality of second network nodes, a packet switching device performing connectivity testing of the pairing;
wherein the selecting operation is repeatedly performed such that each of the plurality of first network nodes with the plurality of second network nodes is selected one or more times;
wherein the connectivity testing of the pairing includes the packet switching device creating a test echo request packet including in a header, a source address of a respective first network node of the pairing and a destination address of a respective second network node of the pairing, and emulating packet processing of the test echo request packet as if it was received over the network from the respective first network node, with the packet processing including ingress processing, egress processing, and sending the test echo request packet into the network;

wherein the connectivity testing of the pairing includes the packet switching device egress processing each received echo reply connectivity test packet corresponding to the sent test echo request packet, with the received echo reply connectivity test packet including in a header, a source address of the respective second network node and a destination address of the respective first network node, and with the egress processing being performed by a network processor designated to egress processing packets being sent to the respective first network node, with the egress processing including intercepting and processing the received particular reply connectivity test packet without forwarding the received echo reply connectivity test packet to the respective first network node, with the processing includes updating one or more data structures based on the received echo reply connectivity test packet, wherein the test echo request packet includes a network layer protocol packet, with the source address being a network protocol source address of the respective first network node, and with the destination address being a network protocol destination address of the respective second network node, and wherein the test echo request packet includes a data link layer packet encapsulation of the network layer protocol packet, with the data link layer packet including a data link level source address of the respective first network node and a data link level destination address of the respective second network node.

13. The method of claim 12, wherein the test echo request packet includes an Ethernet header including a source media access control (MAC) address of the respective first network node and a destination MAC address of the respective second network node, and an Internet Protocol (IP) header including a source IP address of the respective first network node and a destination IP address of the respective second network node; and wherein the received echo reply connectivity test packet includes an Ethernet header including a source MAC address of the respective second network node and a destination MAC address of the f respective irst network node, and an IP header including a source IP address of the respective second network node and a destination IP address of the respective first network node.

14. The method of claim 13, wherein each of the test echo request packet and the received echo reply connectivity test packet uses Internet Control Message Protocol (ICMP) or IPv6 Internet Control Message Protocol (ICMPv6); and wherein a marking value identifying creation of the test echo request packet is included in an ICMP or ICMPv6 data field of each of the test echo request packet and the received test reply.

15. A packet switching device, comprising:
a plurality of processors; and
a plurality of ingress ports;
a plurality of egress ports; and a memory storing instructions, which when executed by one of the plurality of processors, causes the packet switching device to:

receive, on an ingress port of a plurality of ingress ports, a first plurality of packets being sent in a network from a first network node to a second network node, with each packet of the first plurality of packets including, in a header, a source address of the first network node and a destination address of the second network node;

create a second plurality of packets including one or more test echo request packets and the first plurality of packets, with each test echo request packet of the one or more test echo request packets including, in a header, the source address of the first network node and the destination address of the second network node; and for each packet of the second plurality of packets, a first network processor of the plurality of network processors, perform ingress processing on the respective packet including identifying a forwarding result, and sending the respective packet after performing egress processing of the respective packet by a second network processor of the plurality of network processors identified based on the forwarding result, wherein the first network processor performs ingress processing on the one or more test echo request packets in response to the packet switching device ascertaining the first network processor will be processing the first plurality of packets or has processed at least one of the first plurality of packets, wherein each of the second plurality of packets includes a network layer protocol packet, with the source address being a network protocol source address of the first network node, and with the destination address being a network protocol destination address of the second network node, and wherein each of the second plurality of packets includes a data link layer packet encapsulation of the network layer protocol packet, with the data link layer packet including a data link level source address of the first network node and a data link level destination address of the second network node.

16. The packet switching device of claim 15, wherein the creating one or more test echo request packets is performed by the first processor of the packet switching device; and wherein packet switching device response to ascertaining the first network processor will be processing the first plurality of packets or has processed at least one of the first plurality of packets, is communicating the one or more test echo request packets to the first network processor.

17. The packet switching device of claim 15, wherein the network layer protocol packet is Internet Protocol version 4 (IPv4) or Internet Protocol version 6 (IPv6).

18. The packet switching device of claim 15, each of the plurality of test echo request packets uses Internet Control Message Protocol (ICMP) or IPv6 Internet Control Message Protocol (ICMPv6).

19. The packet switching device of claim 15, further comprising instructions, which when executed by one of the plurality of processors, causes the packet switching device to:

intercept, but not forwarding to the first network node, each echo reply connectivity test packet received by the packet switching device and corresponding to a sent one of the one or more test echo request packets, with the echo reply connectivity test packet including in a header, a source address of the second network node and a destination address of the first network node.

20. The packet switching device of claim 15, wherein at least one of the first plurality of packets includes a first node-generated test echo request packet being sent in the network from the first network node through the packet switching device to the second network node; and wherein the packet processing each specific reply packet corresponding to the sent first node-generated test echo request packet received by the packet switching device, with the echo reply connectivity test packet including in a header, a source address of the second network node and a destination address of the first network node, and with the packet processing including forwarding the specific reply packet to the first network device.

* * * * *